United States Patent
Shirota et al.

(10) Patent No.: US 10,606,517 B2
(45) Date of Patent: Mar. 31, 2020

(54) MANAGEMENT DEVICE AND INFORMATION PROCESSING DEVICE

(71) Applicant: KABUSHIKI KAISHA TOSHIBA, Minato-ku (JP)

(72) Inventors: Yusuke Shirota, Yokohama (JP); Mayuko Koezuka, Ohta (JP); Tatsunori Kanai, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 16/116,044

(22) Filed: Aug. 29, 2018

(65) Prior Publication Data

US 2019/0286367 A1 Sep. 19, 2019

(30) Foreign Application Priority Data

Mar. 19, 2018 (JP) .................. 2018-051435

(51) Int. Cl.
 *G06F 12/02* (2006.01)
 *G06F 3/06* (2006.01)

(52) U.S. Cl.
 CPC .......... *G06F 3/0659* (2013.01); *G06F 3/0616* (2013.01); *G06F 3/0644* (2013.01); *G06F 3/0679* (2013.01); *G06F 12/0246* (2013.01)

(58) Field of Classification Search
 None
 See application file for complete search history.

(56) References Cited

U.S. PATENT DOCUMENTS

| | | | | |
|---|---|---|---|---|
| 8,713,381 B2 * | 4/2014 | Moshayedi | ......... | G06F 11/1068 714/710 |
| 10,042,754 B2 * | 8/2018 | Moon | ................ | G06F 12/0246 |
| 2018/0039448 A1 * | 2/2018 | Harasawa | ............. | G06F 3/0659 |

FOREIGN PATENT DOCUMENTS

JP 2008-146255 6/2008

OTHER PUBLICATIONS

R. F. Freitas et al. "Storage-class Memory: The Next Storage System Technology", IBM Journal of Research and Development, vol. 52, No. 4, 2006, pp. 9.

* cited by examiner

*Primary Examiner* — Brian R Peugh
(74) *Attorney, Agent, or Firm* — Oblon, McClelland, Maier & Neustadt, L.L.P.

(57) ABSTRACT

According to an embodiment, a management device includes: a setting memory configured to store an access method indicating which of a first access process of performing writing or reading with respect to data transferred from a non-volatile memory to a first memory, or a second access process of directly performing writing or reading with respect to data stored in the non-volatile memory, is to be executed for each of the plurality of pages; and circuitry configured to select any page set to the second access process among the plurality of pages, as an exchange target page, when a write amount with respect to the non-volatile memory is larger than a set value, and change an access method of the exchange target page from the second access process to the first access process.

15 Claims, 29 Drawing Sheets

FIG.8

COUNTER TABLE

| PAGE NUMBER (IDENTIFICATION INFORMATION) | COUNTER VALUE |
|---|---|
| 0 | 5 |
| 1 | 2 |
| 2 | 1 |
| 3 | 3 |
| ⋮ | ⋮ |

FIG.9

MANAGEMENT TABLE

| ENTRY NUMBER | PAGE NUMBER (IDENTIFICATION INFORMATION) | MAP INFORMATION CACHE LINE NUMBER | | | | | | |
|---|---|---|---|---|---|---|---|---|
| | | 0 | 1 | 2 | 3 | 4 | 5 | ········ |
| 0 | 5 | 0 | 1 | 1 | 0 | 0 | 1 | ········ |
| 1 | 2 | 1 | 0 | 0 | 0 | 0 | 0 | ········ |
| 2 | 12 | 0 | 0 | 0 | 0 | 1 | 0 | ········ |
| 3 | 3 | 0 | 0 | 1 | 0 | 0 | 0 | ········ |
| ⋮ | ⋮ | | | | | | | |
| 63 | 4 | 0 | 0 | 1 | 0 | 0 | 1 | ········ |

FIG.17

MANAGEMENT TABLE

| ENTRY NUMBER | PAGE NUMBER | MAP INFORMATION CACHE LINE NUMBER | | | | | | |
|---|---|---|---|---|---|---|---|---|
| | | 0 | 1 | 2 | 3 | 4 | 5 | ......... |
| 0 | 5 | 0 | 1 | 1 | 0 | 0 | 1 | ......... |
| 1 | 2 | 1 | 0 | 0 | 0 | 0 | 0 | ......... |
| 2 | 12 | 0 | 0 | 0 | 0 | 1 | 0 | ......... |
| 3 | 3 | 0 | 0 | 1 | 0 | 0 | 0 | ......... |
| ⋮ | ⋮ | | | | | | | |
| 63 | 4 | 0 | 0 | 1 | 0 | 0 | 1 | ......... |

SELECT ENTRY 0 HAVING LARGEST NUMBER OF BITS

FIG.19

MANAGEMENT TABLE

| ENTRY NUMBER | PAGE NUMBER | MAP INFORMATION CACHE LINE NUMBER | | | | | | |
|---|---|---|---|---|---|---|---|---|
| | | 0 | 1 | 2 | 3 | 4 | 5 | ......... |
| 0 | 5 | 0 | 1 | 1 | 0 | 0 | 1 | ......... |
| 1 | 2 | 1 | 0 | 0 | 0 | 0 | 0 | ......... |
| 2 | 12 | 0 | 0 | 0 | 0 | 1 | 0 | ......... |
| 3 | 3 | 0 | 0 | 1 | 0 | 0 | 0 | ......... |
| ⋮ | ⋮ | | | | | | | |
| 63 | 4 | 0 | 0 | 1 | 0 | 0 | 1 | ......... |

SELECT FROM ENTRIES 0 AND 63 HAVING NUMBER OF BITS EQUAL TO OR LARGER THAN PREDETERMINED VALUE

FIG.21

COUNTER TABLE

| PAGE NUMBER | COUNTER VALUE (NUMBER OF WRITES) |
|---|---|
| 0000 | 2 |
| 0001 | 3 |
| 0002 | 0 |
| 0003 | 1 |
| ⋮ | ⋮ |
| xxxx | 5 |

← SELECT ENTRY HAVING LARGEST COUNTER VALUE

FIG.32

```
START
  ↓
S221: ACQUIRE MEMORY USE AMOUNT OF FIRST MEMORY UNIT
  ↓
S222: IS MEMORY USE AMOUNT LARGER THAN UPPER LIMIT OF SET RANGE?
  — YES → S223: INCREASE FIRST THRESHOLD →
  — NO ↓
S224: IS MEMORY USE AMOUNT SMALLER THAN LOWER LIMIT OF SET RANGE?
  — YES → S225: DECREASE FIRST THRESHOLD →
  — NO ↓
END
```

FIG.33

| TLB | | MAP INFORMATION |
|---|---|---|
| LOGICAL ADDRESS | PHYSICAL ADDRESS | |
| | | |
| | | |
| | | |

# MANAGEMENT DEVICE AND INFORMATION PROCESSING DEVICE

CROSS-REFERENCE TO RELATED APPLICATIONS

This application is based upon and claims the benefit of priority from Japanese Patent Application No. 2018-051435, filed on Mar. 19, 2018; the entire contents of which are incorporated herein by reference.

FIELD

Embodiments described herein relate generally to a management device and an information processing device.

BACKGROUND

A non-volatile memory such as a flash memory has an upper limit of the number of writes. Thus, an information processing device including the non-volatile memory performs wear leveling control on the non-volatile memory. For example, the information processing device manages the number of writes in units of pages as a write unit, or in units of blocks as a unit larger than the page unit, and writes data for each page on average. As a result, the information processing device can extend the life of the non-volatile memory.

In recent years, high-speed non-volatile memories called storage class memories have been developed. The storage class memories can perform not only writing of data in units of pages but also writing of data, for example, in units of bytes smaller than the page. The non-volatile memory capable of writing data in units of bytes in this manner can be used as a main storage device that functions as a work area of a central processing unit (CPU).

Meanwhile, there is a case where a local memory access occurs in the information processing device so that the number of writes of data with respect to a specific byte increases depending on a characteristic of an application to be executed. In such a case, in the non-volatile memory, the number of writes in units of pages increases although the number of writes of bytes other than the specific byte is small. In the information processing device, as the number of pages for which the local memory access has been occurred increases, the writing efficiency deteriorates so that the life of the non-volatile memory becomes short even if the wear leveling control is performed.

Thus, in the information processing device including the non-volatile memory as the main storage device, it is necessary to control writing to the non-volatile memory such that the life does not become short even if the local memory access occurs.

BRIEF DESCRIPTION OF THE DRAWINGS

FIG. 8 is a view illustrating an example of a counter table;
FIG. 9 is a view illustrating an example of a management table;
FIG. 17 is a view illustrating an entry with the largest number of bits indicating a written state;
FIG. 19 is a view illustrating an entry with the number of bits indicating a written state equal to or larger than a predetermined value;
FIG. 21 is a view illustrating an entry with the largest counter value;
FIG. 32 is a flowchart illustrating a process of changing a first threshold according to the fifth embodiment;
FIG. 33 is a view illustrating a modification of identification information.

DETAILED DESCRIPTION

Figure 1:
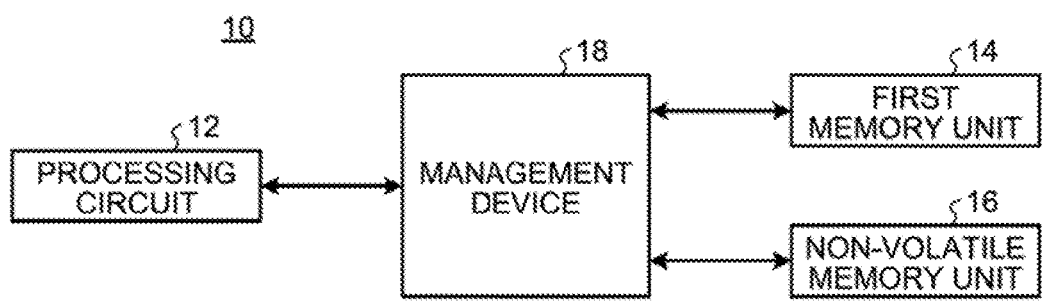
FIG. 1 is a diagram illustrating a hardware configuration of an information processing device.

According to an embodiment, a management device is configured to control reading and writing of data by a processing circuit with respect to a first memory and a non-volatile memory including a plurality of pages. The management device includes a setting memory, and circuitry. The setting memory is configured to store an access method indicating which of a first access process of performing writing or reading with respect to data transferred from the non-volatile memory to the first memory, or a second access process of directly performing writing or reading with respect to data stored in the non-volatile memory, is to be executed for each of the plurality of pages. The circuitry is configured to execute the first access process when receiving a write or read request with respect to a page set to the first access process, and execute the second access process when receiving a write or read request with respect to a page set to the second access process. The circuitry is configured to select any page set to the second access process among the plurality of pages, as an exchange target page, when a write amount with respect to the non-volatile memory is larger than a set value, and change an access method of the exchange target page from the second access process to the first access process.

Hereinafter, an information processing device 10 according to an embodiment will be described in detail with reference to the drawings. Incidentally, a plurality of embodiments will be described hereinafter, but blocks having substantially the same functions and configurations will be denoted by the same reference numerals, and duplicate descriptions will be omitted in second and subsequent embodiments.

First Embodiment

FIG. 1 is a diagram illustrating an example of a hardware configuration of the information processing device 10. The information processing device 10 includes a processing circuit 12, a first memory unit 14, a non-volatile memory unit 16, and a management device 18.

The processing circuit 12 has one or a plurality of processors. The processor is, for example, a central processing unit (CPU). The processor may include one or mere CPU cores. The processing circuit 12 executes a program to process data. The processing circuit 12 reads data from the first memory unit 14 or the non-volatile memory unit 16 or writes data to the first memory unit 14 or the non-volatile memory unit 16 according to execution of the program.

In addition, the processing circuit 12 also has a hierarchical cache memory such as an L1 data cache, an L1 instruction cache, an L2 cache, and an L3 cache. The processing circuit 12 temporarily stores data stored in the first memory unit 14 or the non-volatile memory unit 16 using such a cache memory. For example, when a cache miss occurs in the lowest-level cache (the last-level cache) among the hierarchical caches, the processing circuit 12 accesses the first memory unit 24 or the non-volatile memory unit 16 in units of cache lines to read or write necessary data.

Incidentally, the processing circuit 12 may be any circuit as long as data processing can be executed. For example, the processing circuit 12 may be a graphics processing unit (GPU) which is used in a general-purpose computing on graphics processing unit (GPGPU). In addition, the processing circuit 12 may be an accelerator such as a field programmable gate array (FPGA).

The first memory unit 14 is a main storage device (main memory) used as a work area of the processing circuit 12. The first memory unit 14 is, for example, a volatile storage unit whose data that has been stored disappears when supply of power is stopped. The first memory unit 14 is, for example, a dynamic random access memory (DRAM). Incidentally, the first memory unit 14 may be a non-volatile memory such as magnetoresistive random access memory (MRAM) capable of high-speed access similarly to the DRAM.

In addition, the first memory unit 14 has a larger number of writable times than of the non-volatile memory unit 16. For example, the number of writable times is large to the extent that it is unnecessary to design the first memory unit 14 in consideration of the number of writable times (for example, to the extent that the design can be made assuming no restriction on the number of writes).

The non-volatile memory unit 16 is a memory that keeps storing data even when the supply of power is stopped. The non-volatile memory unit 16 functions as a main storage device of the processing circuit 12 together with the first memory unit 14.

The non-volatile memory unit 16 includes, for example, a large-capacity high-speed non-volatile memory (non-volatile memory) larger in capacity than the DRAM. For example, the non-volatile memory unit 16 is an MRAM, a phase change memory (PCM), a phase random access memory (PRAM), a phase change random access memory (PCRAM), a resistance change random access memory (ReRAM), a ferroelectric random access memory (FeRAM), a 3DXPoint, a memristor, or the like. The non-volatile memory unit 16 may be a memory which is referred to as a so-called storage class memory (SCM). In addition, the non-volatile memory unit 16 may be a module in which a plurality of semiconductor devices are provided on one substrate or a casing or the like.

The non-volatile memory unit 16 has a larger capacity than the first memory unit 14. The capacity of the non-volatile memory unit 16 may be the same as that of the first memory unit 14. In addition, the access speed of non-volatile memory unit 16 is equal to or slightly later than the access speed of the first memory unit 14. In addition, the standby power of the non-volatile memory unit 16 is zero, or the standby power is extremely small as compared with the first memory unit 14. For example, the non-volatile memory unit 16 is a memory whose access latency is between 10 nsec and several μsec.

The non-volatile memory unit 16 is capable of writing and reading data in units of small areas such as a byte unit. Therefore, the processing circuit 12 can directly access the non-volatile memory unit 16 by a load instruction or a store instruction. The processing circuit 12 directly accesses the non-volatile memory unit 16, for example, in units of cache lines.

The management device 18 controls the reading and writing of data performed by the processing circuit 12 with respect to the first memory unit 14 and the non-volatile memory unit 16. The management device 18 processes access requests from the processing circuit 12 with respect to the first memory unit 14 and the non-volatile memory unit 16. That is, the management device 18 writes data in the first memory unit 14 or the non-volatile memory unit 16 in response to a write instruction from the processing circuit 12. In addition, the management device 18 reads data from the first memory unit 14 or the non-volatile memory unit 16 in response to a read instruction from the processing circuit 12 and supplies the read data to the processing circuit 12.

In addition, the management device 18 executes wear leveling control with respect to the non-volatile memory unit 16. More specifically, the management device 18 manages the number of writes of data in each area of the non-volatile memory unit 16. Then, the management device 18 controls a data write position based on the number of writes for each area such that data is written to the whole area of the non-volatile memory unit 16 on average.

Incidentally, the management device 18 is, for example, a memory controller configured as hardware separate from the processing circuit 12. In addition, the management device 18 may be a part of the hardware of the processing circuit 12 (for example, a circuit formed on the same semiconductor substrate as the processing circuit 12), or may be implemented by a combination of a part of the hardware of the processing circuit 12 and the memory controller. In addition, the management device 18 may be implemented by some functions of an operating system executed by the processing circuit 12, or may be implemented by a combination of some functions of the operating system and the memory controller.

In addition, the management device 18 may be, for example, a memory management unit (MMU) configured as hardware separate from the processing circuit 12. In addition, the management device 18 may be implemented by a combination of a part of the hardware of the processing circuit 12 and the memory management unit. In addition, the management device 18 may be implemented by a combination of some functions of the operating system executed by the processing circuit 12 and the memory management unit.

In addition, the management device 18 may be implemented by a combination of the memory controller and the memory management unit (MMU). In addition, the management device 18 may be implemented by a combination of a part of the hardware of the processing circuit 12, the memory controller, and the memory management unit. In addition, the management device 18 may be implemented by a combination of some functions of the operating system executed by the processing circuit 12, the memory controller, and the memory management unit.

Figure 2:
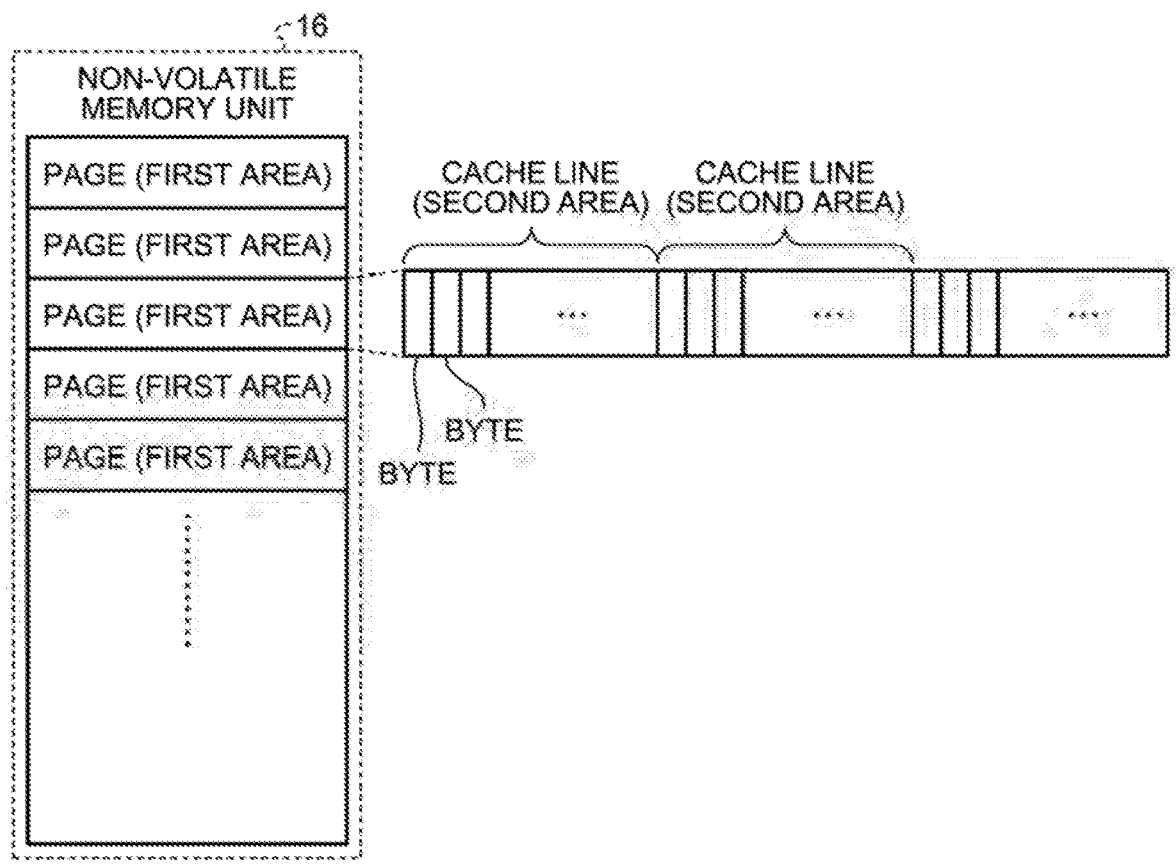
FIG. 2 is a view illustrating a configuration of a non-volatile memory unit.

FIG. 2 is a view illustrating a configuration of the non-volatile memory unit 16. The non-volatile memory unit 16 includes a plurality of pages (first areas). The page corresponds to a unit of data managed by the processing circuit 12. The page corresponds to, for example, a page of a virtual storage device managed by the operating system. The page may be, for example, 4 Kbytes.

In addition, each of the plurality of pages includes a plurality of cache lines (second areas). The cache line corresponds to a unit of data writing with respect to a cache memory in the processing circuit 12. The processing circuit 12 performs writing and reading of data with respect to the non-volatile memory unit 16 in units of cache lines. The processing circuit 12 can also write and read data in units of pages.

The cache line is, for example, 64 bytes. Incidentally, the second area may be a unit smaller than the cache line (for example, a byte unit).

Figure 3:
FIG. 3 is a view illustrating an example of address information.

FIG. 3 is a view illustrating an example of address information. For example, the management device 18 obtains address information divided into three bit fields as illustrated in FIG. 3 from the processing circuit 12.

An upper bit field of the address information indicates a position of a page (target page) for which data writing or data reading is performed. A middle bit field of the address information indicates a position of a cache line (target cache line) of the target page for which data writing or data reading is performed. In addition, a lower bit field of the address information indicates a position of a byte of the target cache for which data writing or data reading is performed.

Figure 4:
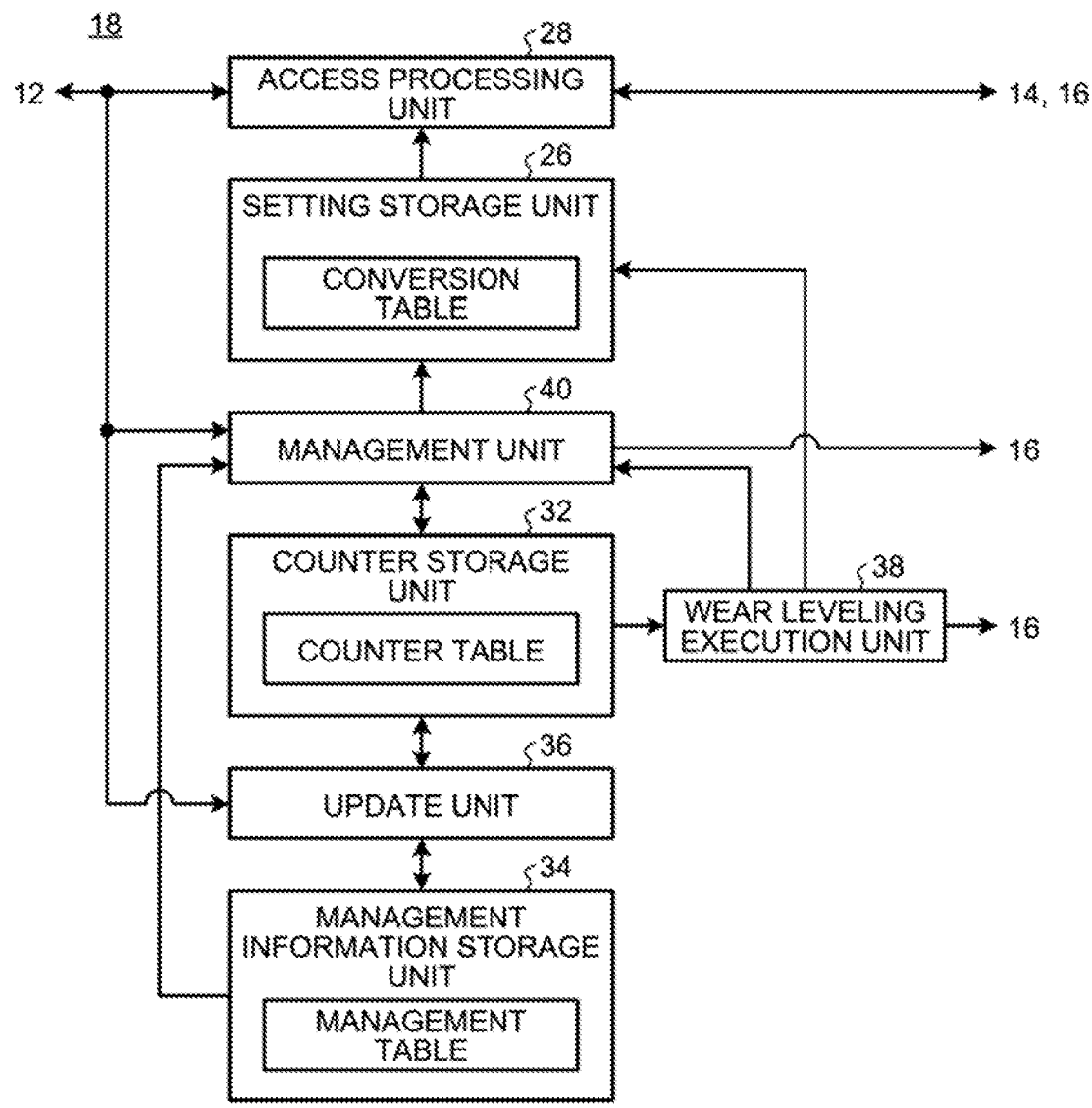
FIG. 4 is a diagram illustrating a configuration of a management device according to a first embodiment.

FIG. 4 is a diagram illustrating a configuration of the management device 18. The management device 18 includes e setting storage unit 26, an access processing unit 28, a counter storage unit 32, a management information storage unit 34, an update unit 36, a wear leveling execution unit 38, and a management unit 40.

The setting storage unit 26 stores a conversion table. The conversion table stores a correspondence between a request address and a corresponding page number (physical address) in the first memory unit 14 or the non-volatile memory unit 16 for each page for which the processing circuit 12 makes an access request.

Furthermore, the conversion table stores an access method indicating which of a first access process and a second access process is to be executed for each page for which the processing circuit 12 makes an access request.

The first access process is a method of performing writing and reading with respect to data that has been transferred from the non-volatile memory unit 16 to the first memory unit 14. The second access process is a method of directly performing writing and reading with respect to data stored in the non-volatile memory unit 16. Incidentally, details of the conversion table will be described later with reference to FIG. 5.

The access processing unit 28 processes access requests from the processing circuit 12 to the first memory unit 14 and the non-volatile memory unit 16. That is, the access processing unit 28 writes data in the first memory unit 14 or the non-volatile memory unit 16 according to the write instruction from the processing circuit 12. In addition, the access processing unit 28 reads data from the first memory unit 14 or the non-volatile memory unit 16 in response to the read instruction from the processing circuit 12 and supplies the read data to the processing circuit 12.

In addition, the access processing unit 28 accesses the first memory unit 14 and the non-volatile memory unit 16 for a page for which the processing circuit 12 has made an access request according to the access method stored in the conversion table. That is, when the access processing unit 28 executes the first access process when receiving a write or read request for a page set to the first access process. In addition, the access processing unit 28 executes the second access process when receiving a write or read request for a page set to the second access process. Details of the access method will be described later with reference to FIGS. 5, 6 and 7.

The counter storage unit 32 stores a counter table. The counter table stores a counter value indicating the number of writes of data for each of the plurality of pages included in the non-volatile memory unit 16. Details of the counter table will be described later with reference to FIG. 8.

The management information storage unit 34 stores a management table. Details of the management table will be described later with reference to FIG. 9.

The update unit 36 updates each counter value stored in the counter table and the management table. When the processing circuit 12 writes data in the non-volatile memory unit 16, the update unit 36 acquires address information of the written data and updates the counter table and the management table based on the acquired address information. A specific processing procedure of the update unit 36 will be described later with reference to FIGS. 10 and 11.

The wear leveling execution unit 38 executes wear leveling control with respect to the non-volatile memory unit 16 based on the counter value for each page stored in the counter storage unit 32. The wear leveling execution unit 38 controls arrangement of data stored in the non-volatile memory unit 16 such that data is written in the whole area in the non-volatile memory unit 16 on average. Incidentally, the processing of the wear leveling execution unit 38 will be described later with reference to FIG. 12.

The management unit 40 performs a process of changing the access method stored in the conversion table. When a write amount with respect to the non-volatile memory unit 16 is larger than a set value, the management unit 40 selects any exchange target page set in the second access process out of the plurality of pages managed by the conversion table. Then, the management unit 40 changes a method of accessing the selected exchange target page from the second access process to the first access process. Incidentally, the detailed configuration and processing of the management unit 40 will be further described in FIG. 13 and subsequent drawings.

Figure 5:
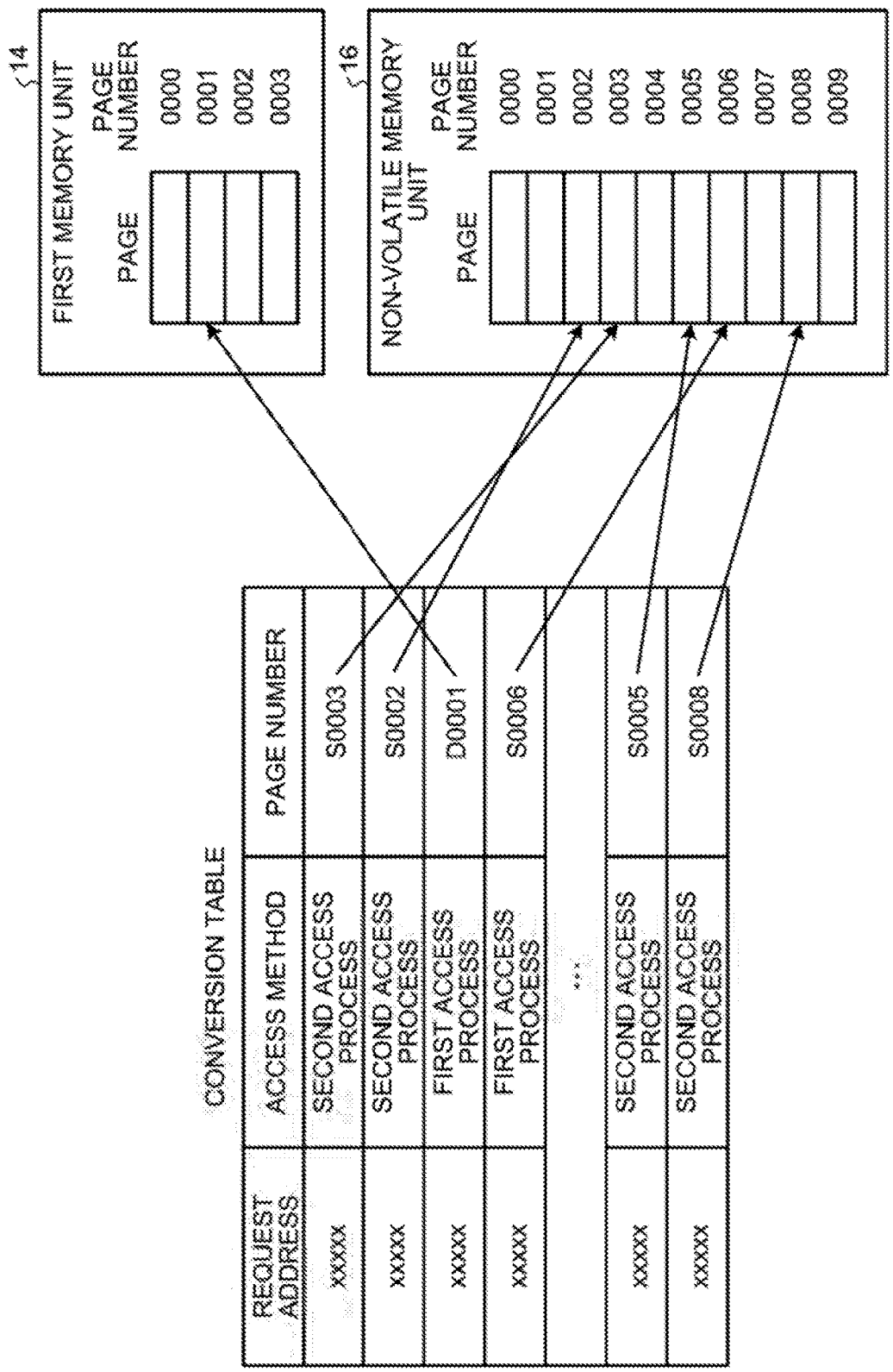
FIG. 5 is a view illustrating an example of a conversion table.

FIG. 5 is a view illustrating an example of the conversion table. The conversion table stores a correspondence between a request address and a corresponding page number (physical address) in the first memory unit 14 or the non-volatile memory unit 16 for each page for which the processing circuit 12 makes an access request. That is, the conversion table stores mapping information indicating any page in the first memory unit 14 or the non-volatile memory unit 16 in which data corresponding to a request address from the processing circuit 12 is stored.

For example, a page described as "Sxxxx" in the column of the page number in the conversion table indicates a page with a page number "xxxx" in the non-volatile memory unit 16 in the example of FIG. 5. For example, a page described as "Dxxxx" in the column of the page number indicates a page with a page number "xxxx" in the first memory unit 14 in the example of FIG. 5. Here, x is an arbitrary value.

Furthermore, the conversion table stores an access method indicating which of a first access process and a second access process is to be executed for each page for which the processing circuit 12 makes an access request. Incidentally, the conversion table is not limited to the configuration illustrated in FIG. 5, but may adopt another configuration.

Figure 6:
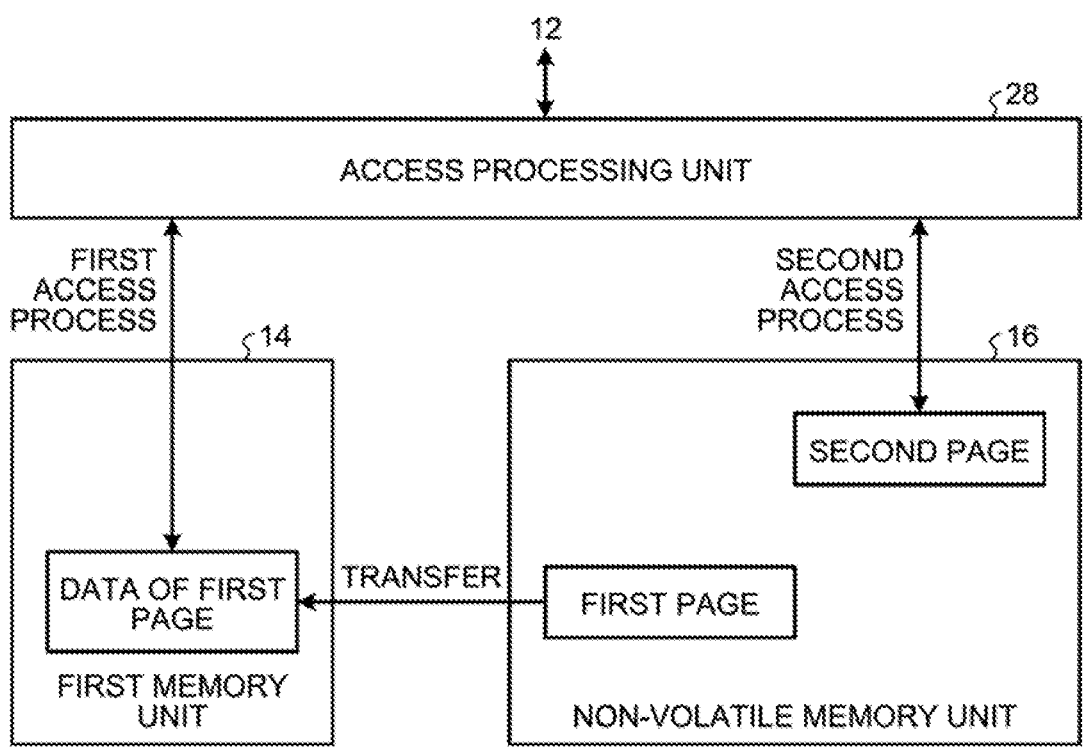
FIG. 6 is a diagram illustrating contents of a first access process and a second access process.

FIG. 6 is a diagram illustrating contents of the first access process and the second access process. The access processing unit 28 executes the first access process with respect to the non-volatile memory unit 16 when receiving a write or read request for a first page set to the first access process.

For example, the access processing unit 28 transfers the entire data stored in the first page of the non-volatile memory unit 16 to be stored in the first memory unit 14 in the first access process as illustrated in FIG. 6. As a result, the first memory unit 14 can store copies of the data stored in the first page in the non-volatile memory unit 16. Subsequently, the access processing unit 28 perform reading and writing of the data that has been transferred from the non-volatile memory unit 16 and stored in the first memory unit 14 in the first access process. For example, the access processing unit 28 reads and writes data in a sire smaller than a page (for example, a size of a cache line of a processor) for the data that has transferred from the non-volatile memory unit 16 to the first memory unit 14. Then, the access processing unit 28 writes the data that has been transferred to the first memory unit 14 back to the first page of the non-volatile memory unit 16 in the first access process in a case where there is no free space in the first memory unit 14 so that it is difficult to transfer data from the non-volatile memory unit 16 to the first memory unit 14, a case where it is determined that storage in the first memory unit 14 is unnecessary, and the like.

Incidentally, the access processing unit 28 may write the data transferred to the first memory unit 14 back to a page other than the first page (the same location). For example, the access processing unit 28 may write the data transferred from the non-volatile memory unit 16 to the first memory unit 14 back to an unused page that is not associated with any request address in the first access process. As a result, the access processing unit 28 can reduce a gap in the number of writes for each page and suppress deterioration in quality of a specific page.

In addition, the access processing unit 28 executes the second access process with respect to the non-volatile memory unit 16 when receiving a write or read request for a second page set to the second access process.

For example, the access processing unit 28 directly perform reading and writing with respect to the second page in the non-volatile memory unit 16 in the second access process as illustrated in FIG. 6. For example, the access processing unit 28 reads and writes data in a size smaller than a page.

In this manner, the access processing unit 28 accesses the non-volatile memory unit 16 by the two types of access methods. For example, when an application with high locality in memory access is executed, the access processing unit 28 accesses a page stored in the non-volatile memory unit 16 through the first access process. As a result, the access processing unit 28 can process the same page at higher speed when the application with high locality in memory access is executed.

In addition, the access processing unit 28 accesses a page stored in the non-volatile memory unit 16 through the second access process, for example, when executing a process with low locality in memory access such as random access. As a result, when executing the process with low locality, the access processing unit 28 can efficiently perform processing by eliminating an overhead of transfer processing from the non-volatile memory unit 16 to the first memory unit 14. In this manner, the access processing unit 28 can achieve the processing efficiency by using the two types of access methods, that is, the first access process and the second access process.

Figure 7:
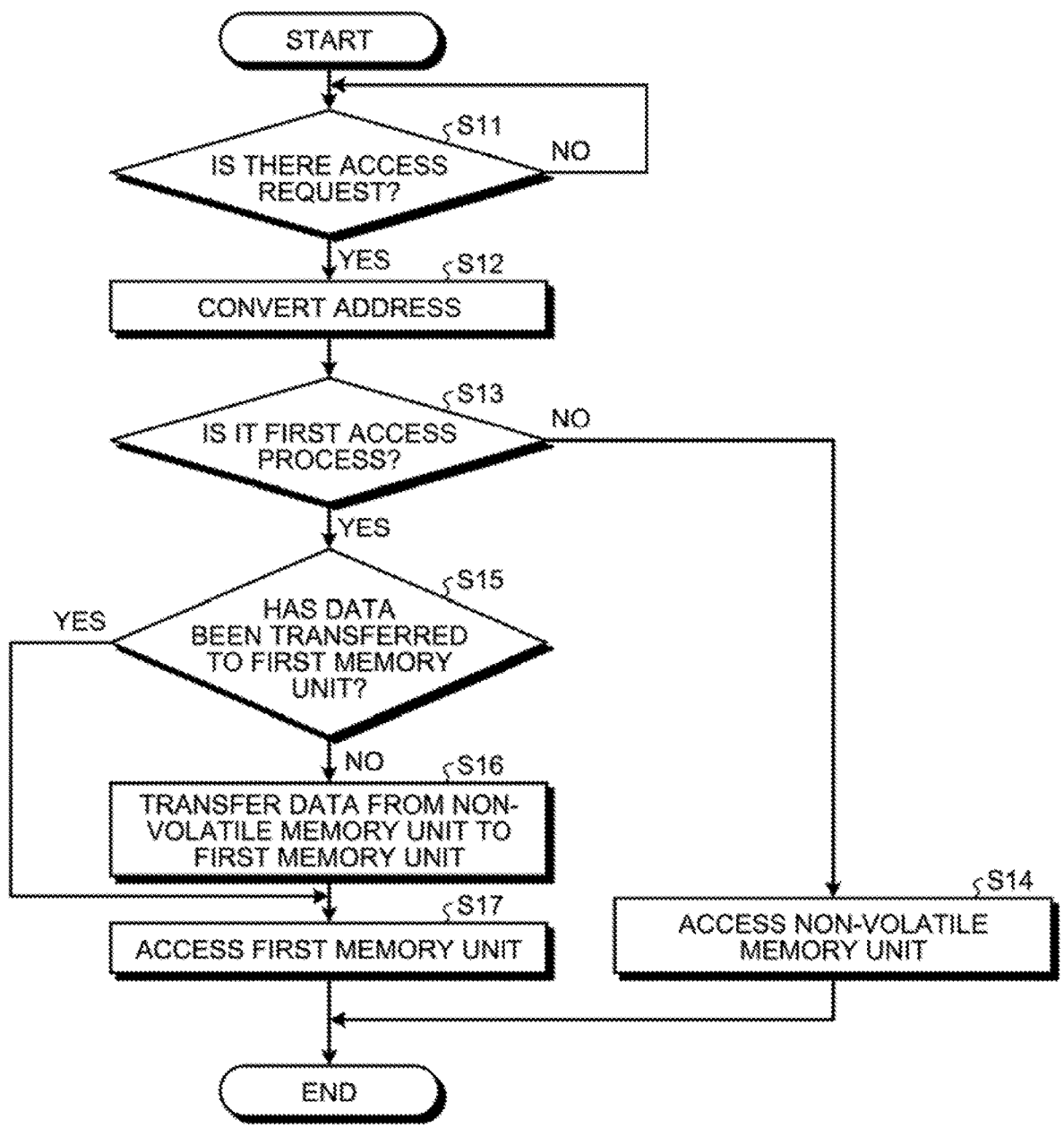
FIG. 7 is a flowchart illustrating an access process according to the first embodiment.

FIG. 7 is a flowchart illustrating the access process using the access processing unit 28 according to the first embodiment. The access processing unit 28 according to the first embodiment accesses the first memory unit 14 and the non-volatile memory unit 16 in accordance with the flowchart illustrated in FIG. 7.

First, in S11, the access processing unit 28 determines whether the access request has been issued from the processing circuit 12. When there is no access request (No in S11), the access processing unit 28 stands by in S11. When there is the access request (Yes in S11), the access processing unit 28 causes the processing to proceed to S12.

In S12, the access processing unit 28 refers to the conversion table and specifies a page number of a target page to be an access destination in the first memory unit 14 or the non-volatile memory unit 16 based on a request address included in the access request. As a result, the access processing unit 28 can execute a process of converting an address from the request address to a physical address.

Next, in S13, the access processing unit 28 determines whether an access method with respect to the target page is the first access process. When the access method with respect to the target page is not the first access process, that is, when the access method is the second access process (No in S13), the access processing unit 28 causes the processing to proceed to S14. In S14, the access processing unit 28 directly accesses the target page in the non-volatile memory unit 16. Then, the access processing unit 28 ends this flow when the process of S14 is completed.

In addition, when the access method with respect to the target page is the first access process (Yes in S13), the access processing unit 28 causes the processing to proceed to S15. In S15, the access processing unit 28 determines whether data has been transferred or not been transferred to the first memory unit 14. The access processing unit 28 can determine whether data has been transferred or not been transferred to the first memory unit 14 by referring to the page number (physical address) in the conversion table. If the transfer has been completed (Yes in S15), the access processing unit 28 causes the processing to proceed to S17.

If the transfer has not been completed (No in S15), the access processing unit 28 causes the processing to proceed to S16. In S16, the access processing unit 28 transfers the data of the target page to the first memory unit 14. In addition, the access processing unit 28 changes the page number (physical address) of the transferred data in the conversion table to a page number of a transfer destination in the first memory unit 14. Upon completion of the processing of S16, the access processing unit 28 causes the processing to proceed to S17.

In S17, the access processing unit 28 accesses the target page in the first memory unit 14. Then, the access processing unit 28 ends this flow when the process of S17 is completed. By executing the processing as described above, the access processing unit 28 can access the first memory unit 14 and the non-volatile memory unit 16 according to the access method indicated in the conversion table.

FIG. 8 is a view illustrating an example of the counter table. The counter table stores a counter value indicating the number of writes of data for each of the plurality of pages (first areas) included in the non-volatile memory unit 16. For example, the counter table stores a counter value in association with identification information (for example, a page number) for identifying a plurality of pages included in the non-volatile memory unit 16.

Each counter value may represent an estimated value of the number of writes of the corresponding page. Each counter value is set to, for example, zero at the initial stage such as shipping from the factory. Each counter value is incremented by one by the update unit 36.

FIG. 9 is a view illustrating an example of the management table. The management table has a predetermined number of entries. For example, the management table has 64 entries in the example of FIG. 9.

It is possible to store management information in each entry. That is, the management table can store the management information for each of a predetermined number of pages. The number of management information that can be stored in the management table is smaller than the number of pages included in the non-volatile memory unit 16. The management information on a page that has been most recently accessed in the non-volatile memory unit 16 by the processing circuit 12 is stored in the management table. When the entries are fully used in the management table, for example, the oldest management information (management information for which the longest time has elapsed since the access thereof) is erased and new management information is stored.

The management information includes identification information and map information.

The identification information is a number (page number) configured to identify a page managed by the corresponding management information. The update unit 36 can determine any page that is managed by the management information stored in the relevant entry by referring to the identification information.

The map information indicates whether each of a plurality of cache lines (second areas) included in the corresponding page has been written or unwritten. For example, when data is not stored in the corresponding page, all the states of the plurality of cache lines included in the corresponding page are set to unwritten states in the map information. In the management information, when data is written in any cache line from the state where no data is stored in the corresponding page, the state of the cache line is set to be the written state and states of the other cache lines are set to unwritten states.

For example, the map information has a bit corresponding to each of a plurality of cache lines included in the page. For example, when 64 cache lines are included in one page, the map information has 64 bits. In the case of being one, for example, each bit indicates that the corresponding cache line is the written state. In addition, in the case of being zero, for example, each bit indicates that the corresponding cache line is the unwritten state.

Incidentally, the management information is not necessarily stored in all the entries of the management table. That is, there may be an unused entry in the management table.

Figure 10:
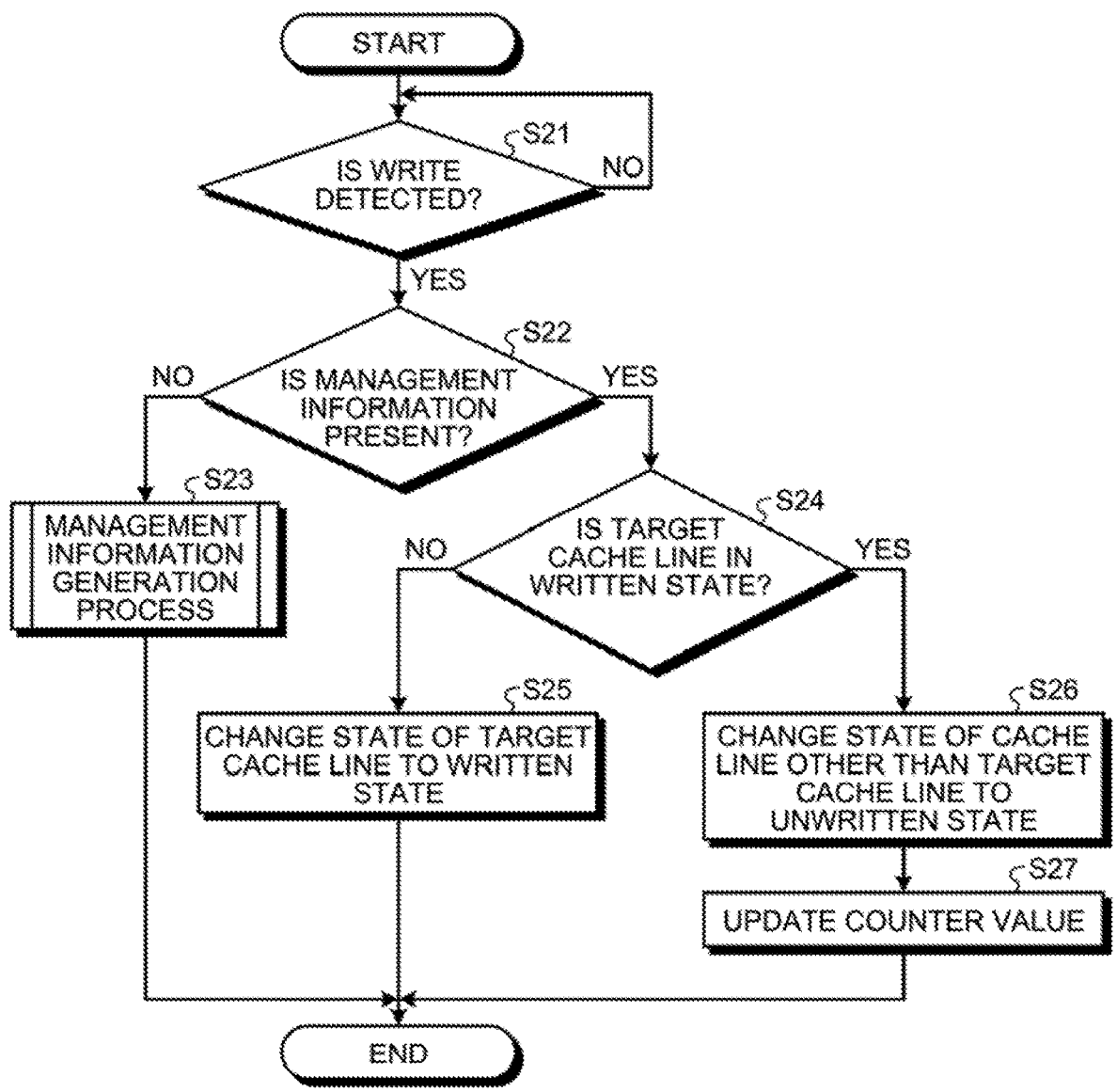
FIG. 10 is a flowchart illustrating a flow of processing executed by an update unit.

FIG. 10 is a flowchart illustrating a flow of processing executed by the update unit 36. The update unit 36 updates the counter table and the management table according to the flowchart illustrated in FIG. 10.

First, in S21, the update unit 36 detects whether data has been written in the non-volatile memory unit 16. The update unit 36 stands by in S21 when the writing has not performed (No in S21), and causes the processing to proceed to S22 when the writing has been performed (Yes in S21).

In S22, the update unit 36 determines whether management information on a target page (target first area), which is a page to which data to be written (first data) is written, is present in the management table.

When the management information on the target page is not present in the management table (No in S22), the update unit 36 causes the processing to proceed to S23. In S23, the update unit 36 executes the management information generation process. The management information generation process will be described with reference to FIG. 11. When the management information generation process is completed, the update unit 36 ends this flow and waits for the next writing.

When the management information on the target page is present in the management table (Yes in S22), the update unit 36 causes the processing to proceed to S24.

In S24, the update unit 36 refers to the management information in the target page and determines whether a state of a target cache line (target second area) that is cache line to which the first data is to be written is the written state. For example, the update unit 36 refers to the map information in the management information on the target page and determines whether a bit corresponding to the target cache line is one.

When the target cache line is the unwritten state (No in S24), the update unit 36 causes the processing to proceed to S25. In S25, the update unit 36 changes the state of the target cache line indicated by the management information on the target page from the unwritten state to the written state. For example, the update unit 36 changes the corresponding bit from zero to one. As a result, the update unit 36 can reflect the state of the non-volatile memory unit 16 after the first data has been written to the management table. When the process of S25 is completed, the update unit 36 ends this flow and waits for the next writing.

When the target cache line is the written state, for example, when the bit corresponding to the target cache line is one (Yes in S24), the update unit 36 causes the processing to proceed to S26. In S26, the update unit 36 changes states of cache lines other than the target cache line indicated by the management information on the target page to the unwritten state. That is, the update unit 36 sets only the target cache line indicated by the management information on the target page to the written state, and sets the other cache lines to the unwritten state. For example, the update unit 36 sets only the corresponding bit to one and sets the other bits to zero.

As a result, the update unit 36 can reflect the state of the non-volatile memory unit 16 after the first data has been written in the target cache line to the management table.

When S26 is completed, the update unit 36 causes the processing to proceed to S27. In S27, the update unit 36 updates a counter value for the target page. For example, the update unit 36 increments a counter value corresponding to a page number included in address information by one in the counter table. As a result, the update unit 36 can update the number of writes of the target page.

Incidentally, the update unit 36 may execute the processes of S26 and S27 in the reverse order. When the processes of S26 and S27 are completed, the update unit 36 ends this flow and waits for the next writing.

Figure 11:
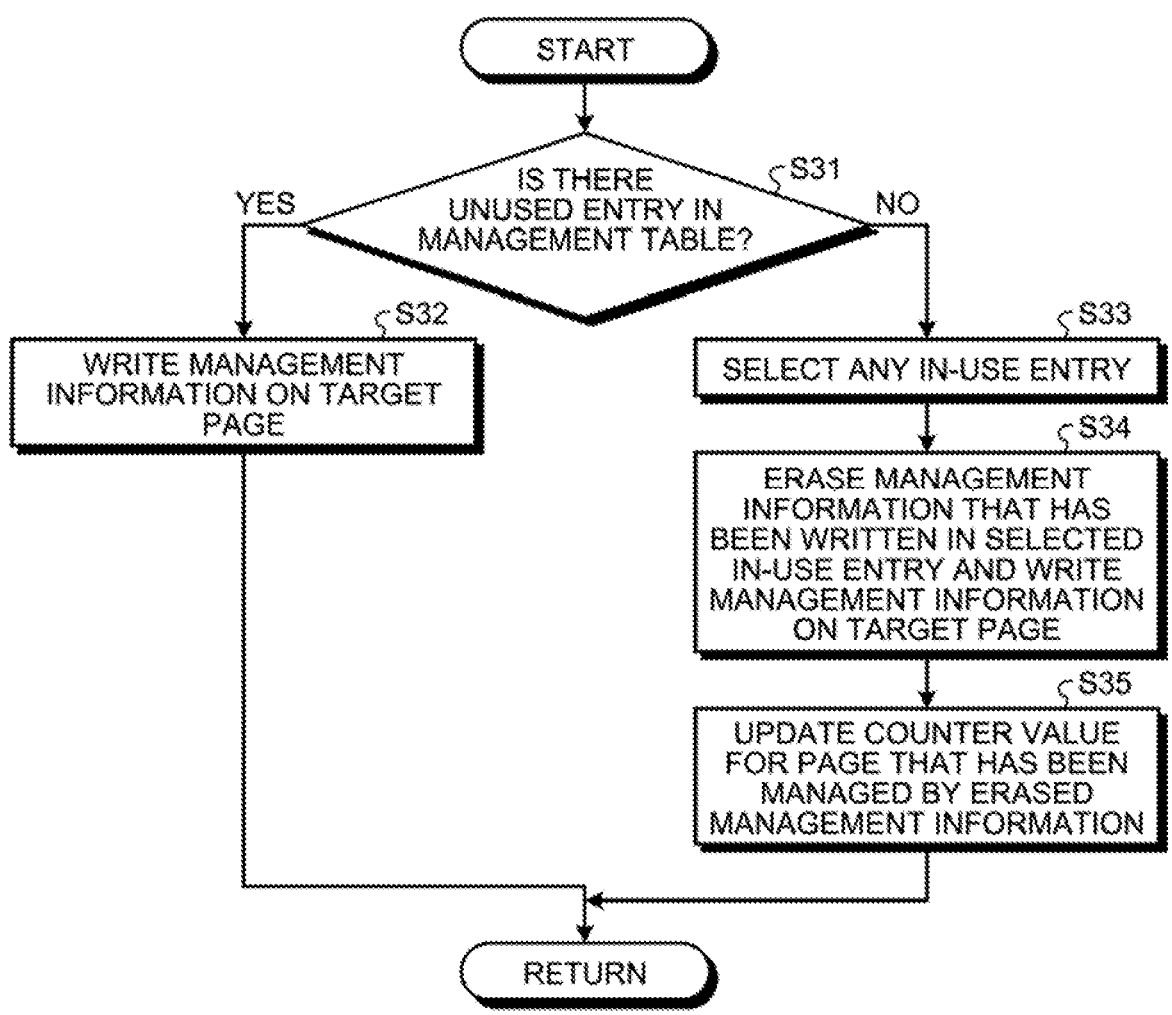
FIG. 11 is a flowchart illustrating a flow of a management information generation process.

FIG. 11 is a flowchart illustrating a flow of management information generation process executed by the update unit 36. The update unit 36 executes processing from S31 to S35 illustrated in FIG. 11 in the management information generation process in S23 of FIG. 10.

First, in S31, the update unit 36 determines whether there is an unused entry in the management table. That is, the update unit 36 determines whether an entry in which management information is not stored is present in the management table.

When there is an unused entry (Yes in S31), the update unit 36 causes the processing to proceed to S32. In S32, the update unit 36 writes the management information on the target page in the unused entry. That is, the update unit 36 writes the management information, which includes the identification information for identifying the target page and the map information in which only the target cache line is set to the written state and the ether area are set to the unwritten state, into the unused entry.

As a result, the update unit 36 can reflect the state of the non-volatile memory unit 16 after the first data has been written to the management table. When the process of S32 is completed, the update unit 36 returns the processing to the flow of FIG. 10.

When there is no unused entry (No in S31), the update unit 36 causes the processing to proceed to S33. In S33, the update unit 36 selects any in-use entry from the management table. For example, the update unit 36 selects an in-use entry storing the oldest management information. Incidentally, the update unit 36 may select any in-use entry according to another algorithm.

When S33 is completed, the update unit 36 causes the processing to proceed to S34. In S34, the update unit 36 erases the management information written in the selected in-use entry and writes the management information on the target page. That is, the update unit 36 overwrites the management information, which includes the identification information for identifying the target page and the map information in which only the target cache line is set to the written state and the other area are set to the unwritten state, in the selected in-use entry.

As a result, the update unit 36 can erase the selected management information (for example, the oldest management information) from the management table and store the new management information in the management table. Then, the update unit 36 can reflect the state of the non-volatile memory unit 16 after the first data is written in the management table.

When S34 is completed, the update unit 36 causes the processing to proceed to S35. In S35, the update unit 36 updates a counter value for a page that has been managed by the management information erased from the management table. For example, the update unit 36 increments the counter value corresponding to a page number included in the management information to be erased by one in the counter table.

By executing the process of S35, the update unit 36 can update the number of writes assuming that data has been additionally written on the page for which management using the management table has been completed. As a result, the update unit 36 can estimate the number of writes for a page that is not actively managed by the management table.

Incidentally, the update unit 36 may execute the processes of S34 and S35 in the reverse order. When the processes of S34 and S35 are completed, the update unit 36 returns the processing to the flow of FIG. 10.

As described above, the management device 18 stores the smaller number of pieces of management information than the number of pages included in the non-volatile memory unit 16. As a result, it is possible to reduce the number of entries in the management table according to the management device 18, and thus, it is possible to reduce the storage capacity of the management information storage unit 34.

Furthermore, the management device 18 updates the counter value for the page that is not managed by the management table at the timing when the management information is erased from the management table. As a result it is possible to accurately estimate the number of writes for ail the pages included in the non-volatile memory unit 16 according to the management device 18.

Figure 12:
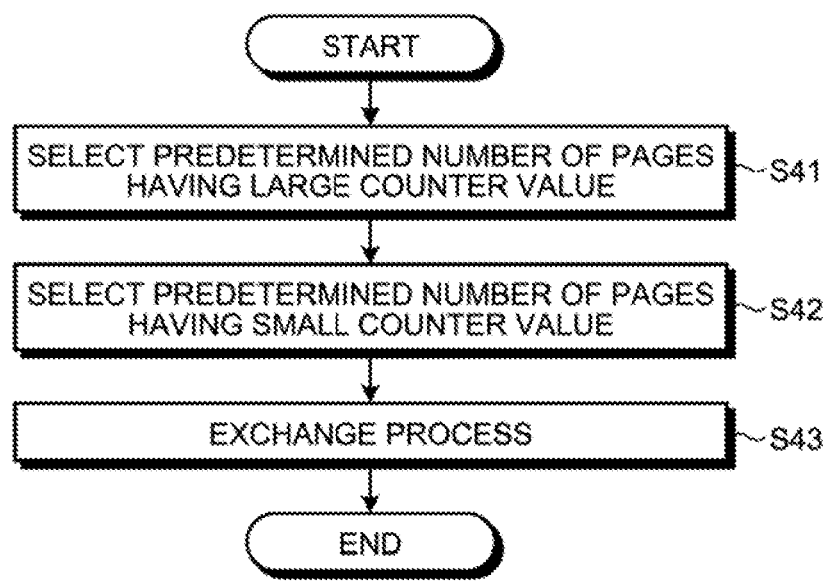
FIG. 12 is a flowchart illustrating a flow of a wear leveling process.

FIG. 12 is a flowchart illustrating a flow of the wear leveling process executed by the wear leveling execution unit 38. The wear leveling execution unit 38 executes wear leveling according to the flowchart illustrated in FIG. 12.

For example, the wear leveling execution unit 38 regularly performs the wear leveling illustrated in FIG. 12. For example, the wear leveling execution unit 38 executes wear leveling every time a counter value in the counter table is updated a predetermined number of times.

First, in S41, the wear leveling execution unit 38 refers to the counter table and selects a predetermined number of pages starting from a page having a larger counter value. Next, in S42, the wear leveling execution unit 38 refers to the counter table and selects the same number of pages starting from a page having a smaller counter value.

Next, in S43, the wear leveling execution unit 38 exchanges page positions of data recorded in the predetermined number of pages from the page having the larger counter value in the non-volatile memory unit 16 and data recorded in the predetermined number of pages from the page having the smaller counter value. Furthermore, in S43, the wear leveling execution unit 38 corrects a page number indicating a physical address of the data whose page position has been changed in the conversion table.

By executing the above processing, the wear leveling execution unit 38 can control a write position of data based on the number of writes for each page such that data is written to the whole area of the non-volatile memory unit 16 on average. Incidentally, the wear leveling execution unit 38 may execute the wear leveling through processing different from the flowchart illustrated in FIG. 12.

Figure 13:
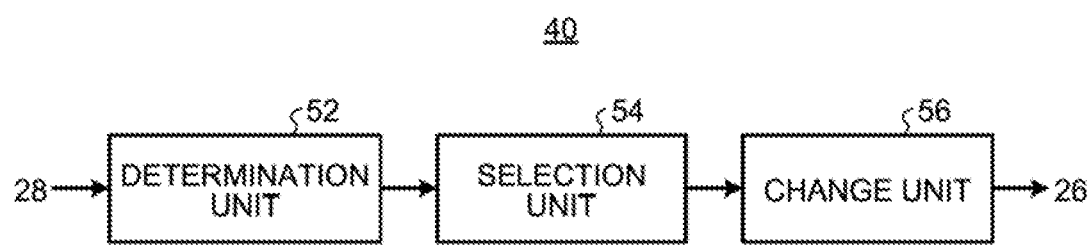
FIG. 13 is a diagram illustrating a configuration of a management unit.

FIG. 13 is a diagram illustrating a configuration of the management unit 40. The management unit 40 includes a determination unit 52, a selection unit 54, and a change unit 56.

The determination unit 52 detects a write amount with respect to the non-volatile memory unit 16. Then, the determination unit 52 determines whether the write amount with respect to the non-volatile memory unit 16 is larger than a set value. For example, the determination unit 52 detects the number of writes with respect to the non-volatile memory unit 16 every predetermined period and determines whether the number of writes in a predetermined period is greater than a first threshold that is the set value.

When the write amount with respect to the non-volatile memory unit 16 is larger than the set value, the selection unit 54 selects any page, set to the second access process among the plurality of pages included in the non-volatile memory unit 16, as an exchange target page. For example, the selection unit 54 selects, as the exchange target page, such a page that write amount (for example, the number of writes in the predetermined period) with respect to the non-volatile memory unit 16 decreases by changing the access method of the page to the first, access process.

The change unit 56 changes the access method of the selected exchange target page from the second access process to the first access process. Specifically, the change unit 56 changes the access method of the selected exchange target page in the conversion table to the first access process.

Figure 14:
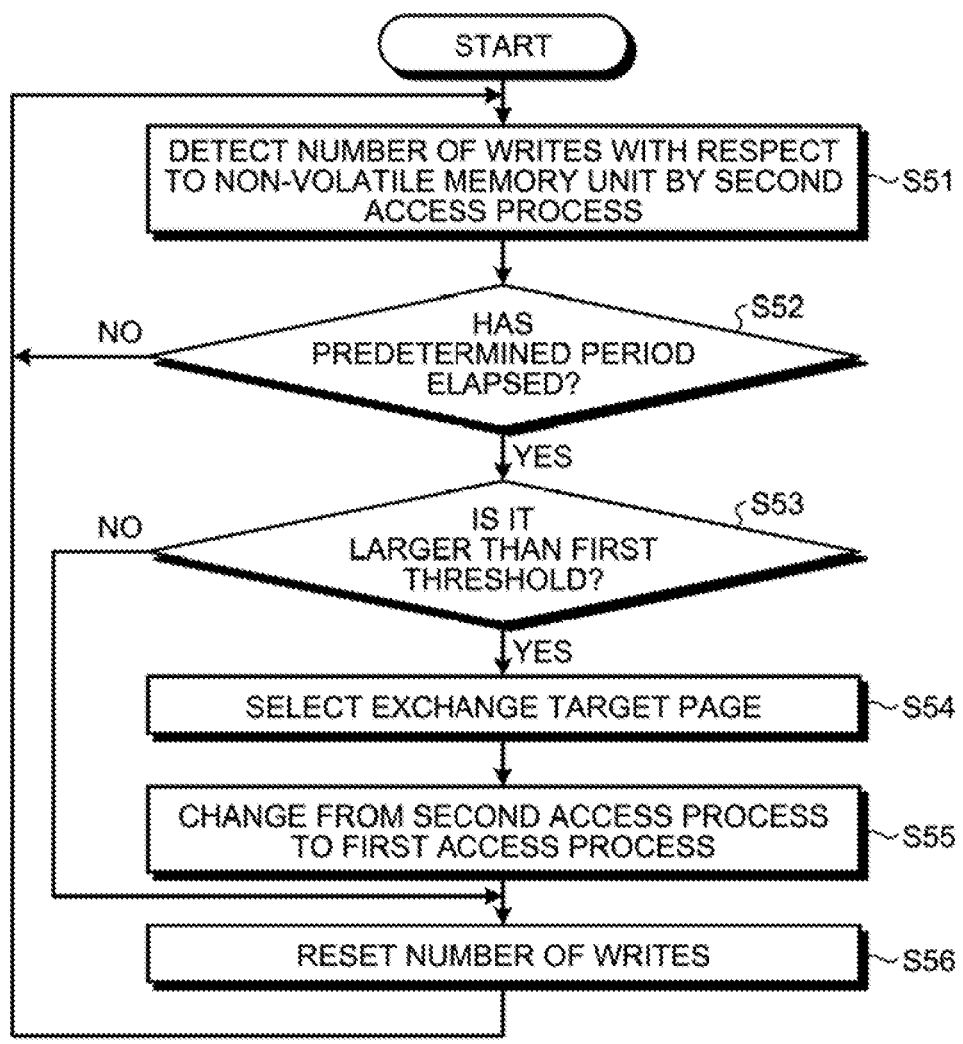
FIG. 14 is a flowchart illustrating processing executed by the management unit according to the first embodiment.

FIG. 14 is a flowchart illustrating processing executed by the management unit 40 according to the first embodiment. The management unit 40 executes the processing according to the flowchart illustrated in FIG. 14 and adjusts the write amount with respect to the non-volatile memory unit 16.

First, in S51, the management unit 40 detects the number of writes with respect to the non-volatile memory unit 16 by the second access process. Next, in S52, the management unit 40 determines whether the predetermined period has elapsed. If the predetermined period has not elapsed (No in S52), the management unit 40 continues to execute the detection process of S51. When the predetermined period has elapsed (Yes in S52), the management unit 40 causes the processing to proceed to S53.

In S53, the management unit 40 determines whether the number of writes with respect to the non-volatile memory unit 16 in the predetermined period is larger than the first threshold set in advance. When the number of writes is net larger than the first threshold (No in S53), the management unit 40 causes the processing to proceed to S56. When the number of writes is larger than the first threshold (Yes in S53), the management unit 40 causes the processing to proceed to S54.

In S54, the management unit 40 selects any page, set to the second access process among the plurality of pages included in the non-volatile memory unit 16, as an exchange target page. Incidentally, a specific example of the process of selecting an exchange target page will be described later with reference to FIGS. 16 to 23.

Next, in S55, the management unit 40 accesses the conversion table and changes the access method of the selected exchange target page from the second access process to the first access process.

Next, in S56, the management unit 40 resets the number of writes to zero, for example, and returns the processing to S51. As a result, the management unit 40 can detect the number of writes with respect to the non-volatile memory unit 16 in the next predetermined period. Then, the management unit 40 executes processing from S51 to S56 in the next predetermined period. In this manner, the management unit 40 can detect the number of writes with respect to the non-volatile memory unit 16 every predetermined period and change the access method of the exchange target page from the second access process to the first access process when the number of writes in the predetermined period is larger than the first threshold.

Figure 15:
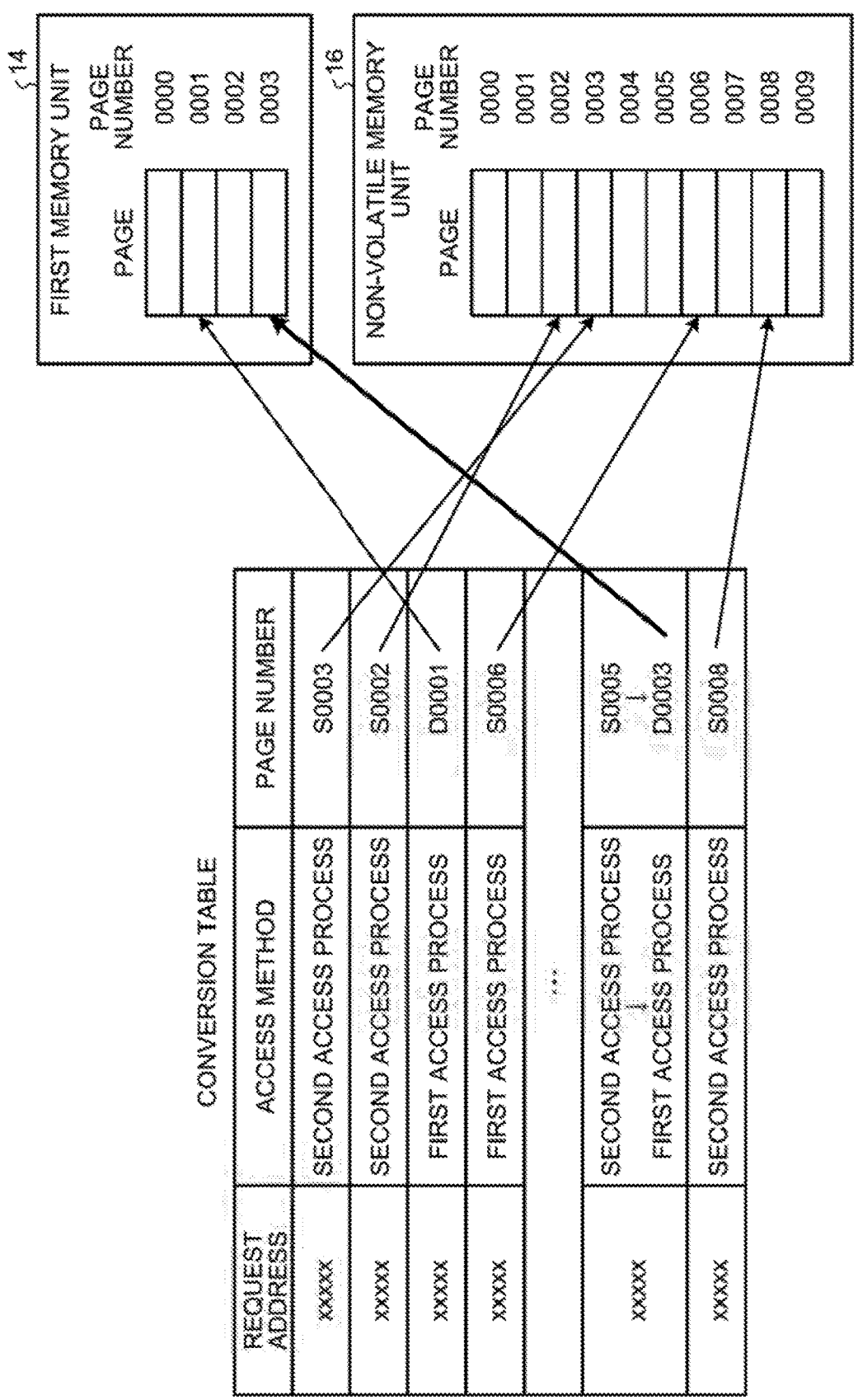
FIG. 15 is a view for describing a process of changing an access method with respect to the conversion table.

FIG. 15 is a view for describing the process of changing the access method with respect to the conversion table. For example, when the number of writes with respect to the non-volatile memory unit 16 by the second access process is larger than the first threshold in a certain period, the management unit 40 selects one page set to the second access process, the page registered in the conversion table, as an exchange target page. For example, the management unit 40 selects a page with a page number "S0005" as the exchange target page in the example of FIG. 15. Then, the management unit 40 changes the access method of the selected exchange target page from the second access process to the first access process.

Thereafter, the access processing unit 28 receives an access request from the processing circuit 12 for the page with the page number "S0005". In this case, the access processing unit 28 executes the first access process for the page with the page number "S0005". In the example of FIG. 15, the access processing unit 28 copies data of the page with the page number "S0005" to a page with a page number "D0003" of the first memory unit 14. Furthermore, the access processing unit 28 changes the page number of the conversion table from "S0005" to "D0003". Then, the access processing unit 28 performs writing and reading of data included in this page with respect to the page with the page number "D0003" in the first memory unit 14.

In this manner, when the write amount with respect to the non-volatile memory unit 16 is larger than the set value, the management unit 40 can reduce the write amount with respect to the non-volatile memory unit 16. For example, the management unit 40 selects a page, which is locally accessed such that data is repeatedly written for the same address, as an exchange target page. As a result, the management unit 40 can efficiently reduce the write amount with respect to the non-volatile memory unit 16.

Figure 16:
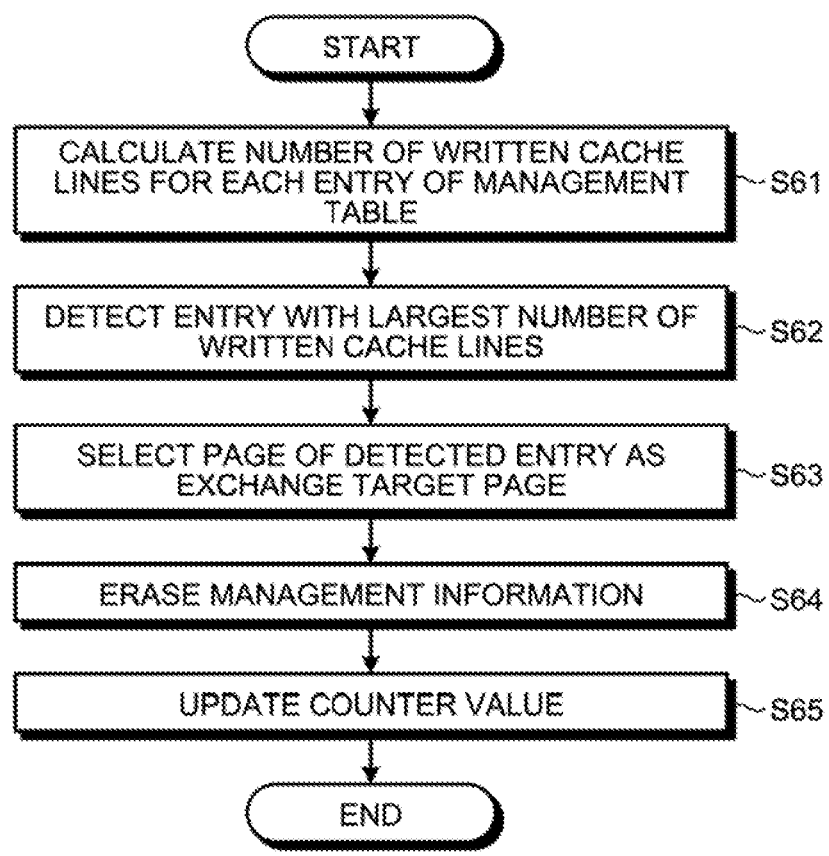
FIG. 16 is a flowchart illustrating a first example of a process of selecting an exchange target page.

FIG. 16 is a flowchart illustrating a first example of the process of selecting an exchange target page. FIG. 17 is a view illustrating an entry with the largest number of bits indicating the written state in the management table.

The management unit 40 selects the exchange target page according to the flowchart illustrated in FIG. 16. First, in S61, the management unit 40 calculates the number of written cache lines for each entry in the management table. For example, the management unit 40 calculates the number of cache lines whose bit in the map information is set to one.

Next, in S62, the management unit 40 detects an entry with the largest number of written cache lines. For example, in the example of FIG. 17, the management unit 40 detects an entry with an entry number "0" having the largest number of bits set to one. Next, in S63, the management unit 40 selects a page registered in the detected entry as an exchange target page. As a result, the management unit 40 can select the page which has the largest number of cache lines (second areas) in the written state, the page in which management information is stored based on the management table, as the exchange target page.

Next, in S64, the management unit 40 erases management information of the exchange target page in the management table. Then, in S65, the management unit 40 accesses the counter table and updates a counter value of the exchange target page. For example, the management unit 40 accesses the counter table and increments the counter value of the exchange target page by one. The management unit 40 ends this flow when the process of S65 is completed.

Through the above processing, the management unit 40 can select a page having a large write amount with respect to the non-volatile memory unit 16 as the exchange target page. As a result, the management unit 40 can reduce the write amount with respect to the non-volatile memory unit 16.

Figure 18:
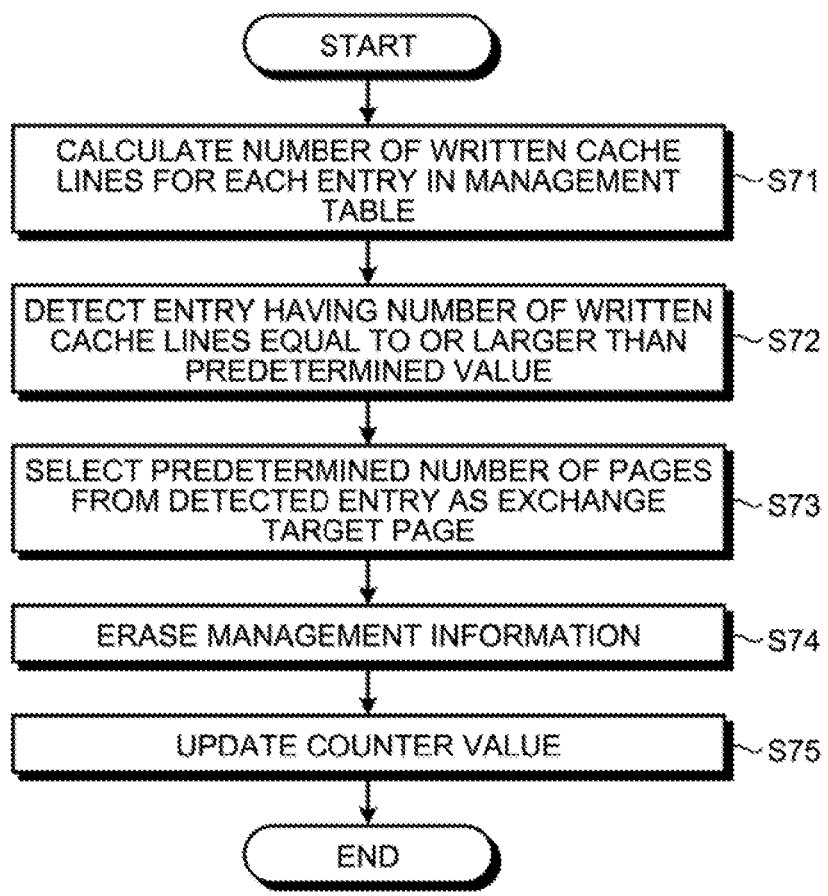
FIG. 18 is a flowchart illustrating a second example of the process of selecting an exchange target page.

FIG. 18 is a flowchart illustrating a second example of the process of selecting an exchange target page. FIG. 19 is a view illustrating an entry with the number of bits indicating a written state equal to or larger than a predetermined value in the management table.

The management unit 40 may select an exchange target page according to the flowchart illustrated in FIG. 18. First, in S71, the management unit 40 calculates the number of written cache lines for each entry in the management table.

Next, in S72, the management unit 40 detects an entry in which the number of written cache lines is equal to or larger than a predetermined value. For example, in the example of FIG. 19, the management unit 40 detects two entries with an entry number "0" and an entry number "63". Next, in S73, the management unit 40 selects a predetermined number of pages from among the detected entries as the exchange target page. As a result, the management unit 40 can select the exchange target page out of at least one page which has the number of cache lines (second areas) in the written state equal to or larger than the predetermined value, the page in which management information is stored based on the management table.

Next, in S74, the management unit 40 erases management information of the exchange target page in the management table. Then, in S75, the management unit 40 accesses the counter table and updates a counter value of the exchange target page. The management unit 40 ends this flow when the process of S75 is completed.

Through the above processing, the management unit 40 can select a page having the large number of writes as the exchange target page. However, there is a room for further writing unless data has not been written more than a predetermined value at a current timing even in a page having a large write amount, and thus, the management unit 40 does not select the page as the exchange target page. As a result the management unit 40 can reduce the write amount with respect to the non-volatile memory unit 16 while efficiently using the storage area of the non-volatile memory unit 16.

Figure 20:
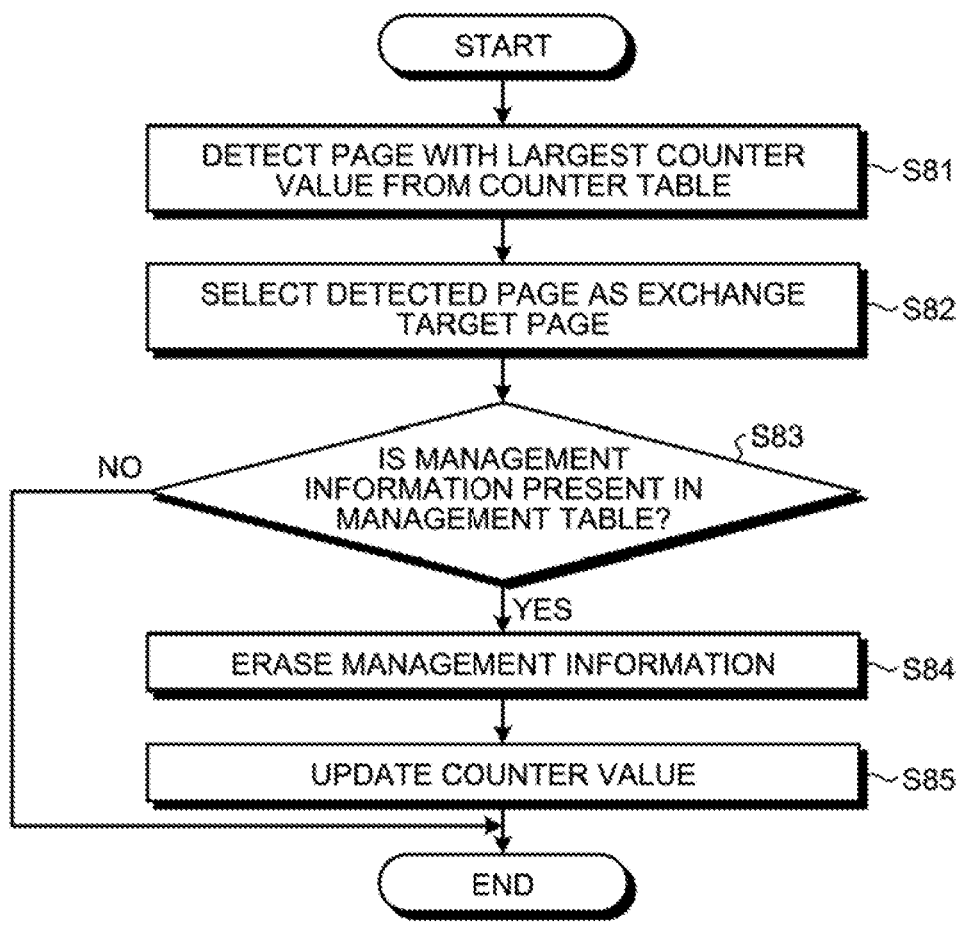
FIG. 20 is a flowchart illustrating a third example of the process of selecting an exchange target page.

FIG. 20 is a flowchart illustrating a third example of the process of selecting an exchange target page. FIG. 21 is a view illustrating a page with the largest counter value in the counter table.

The management unit 40 may select an exchange target page according to the flowchart illustrated in FIG. 20. First, in S81, the management unit 40 detects the page having the largest counter value from the counter table. For example, in the example of FIG. 21, the management unit 40 detects a page with a counter value "5".

Next, in S82, the management unit 40 selects the detected page as an exchange target page. As a result, the management unit 40 can select the page with the largest counter value as the exchange target page.

Next, in S83, the management unit 40 determines whether management information of the exchange target page is present in the management table. When the management information of the exchange target page is not present in the management table (No in S83), the management unit 40 ends this flow.

When the management information of the exchange target page is present in the management table (Yes in S83), the management unit 40 causes the processing to proceed to S84. Next, in S84, the management unit 40 erases the management information of the exchange target page in the management table. Then, in S85, the management unit 40 accesses the counter table and updates a counter value of the exchange target page. The management unit 40 ends this flow when the process of S85 is completed.

Through the above processing, the management unit 40 can select a page having the large number of writes as the exchange target page. As a result, the management unit 40 can reduce the write amount with respect to the non-volatile memory unit 16.

Figure 22:
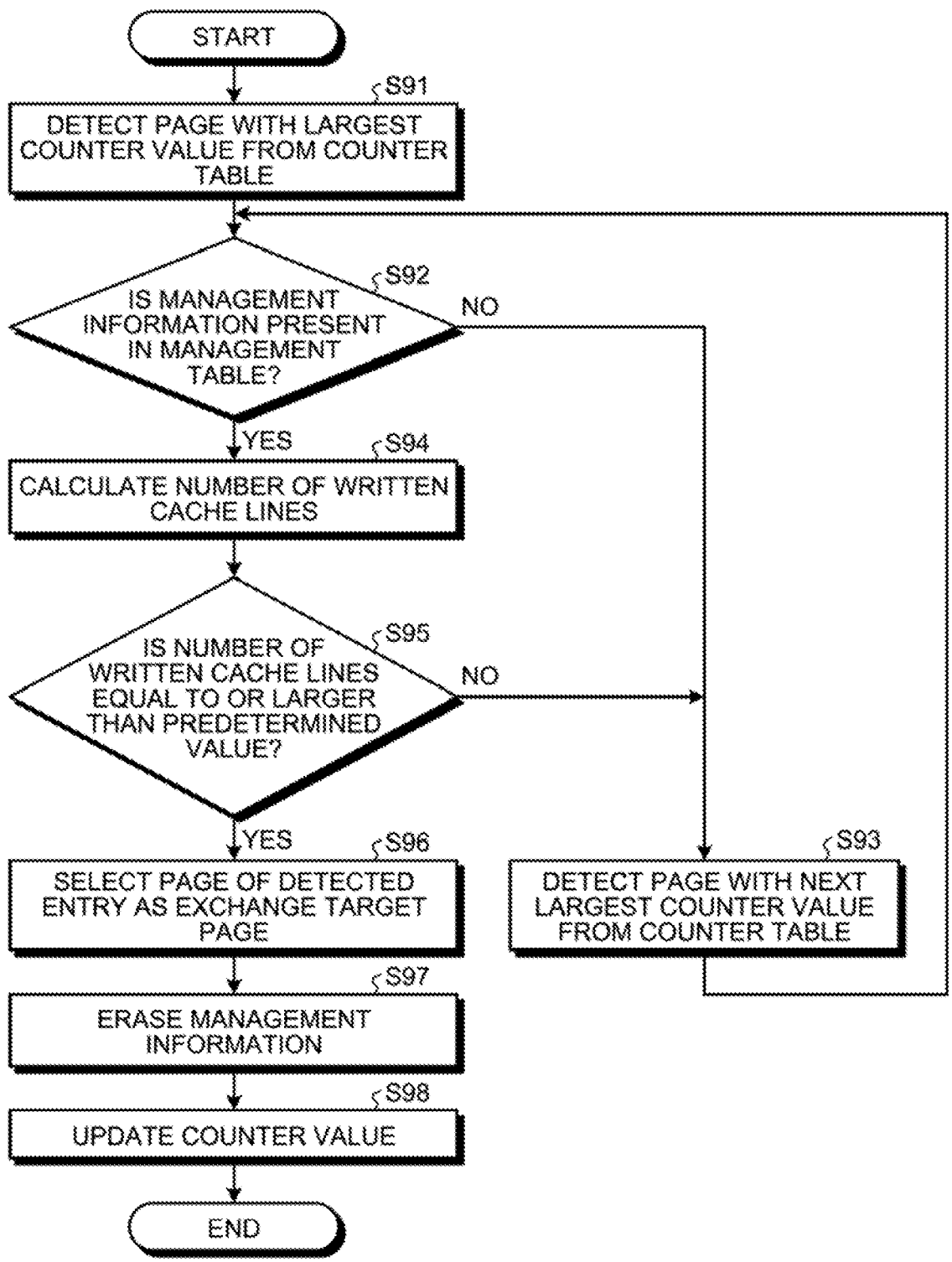
FIG. 22 is a flowchart illustrating a fourth example of the process of selecting an exchange target page.
Figure 23:
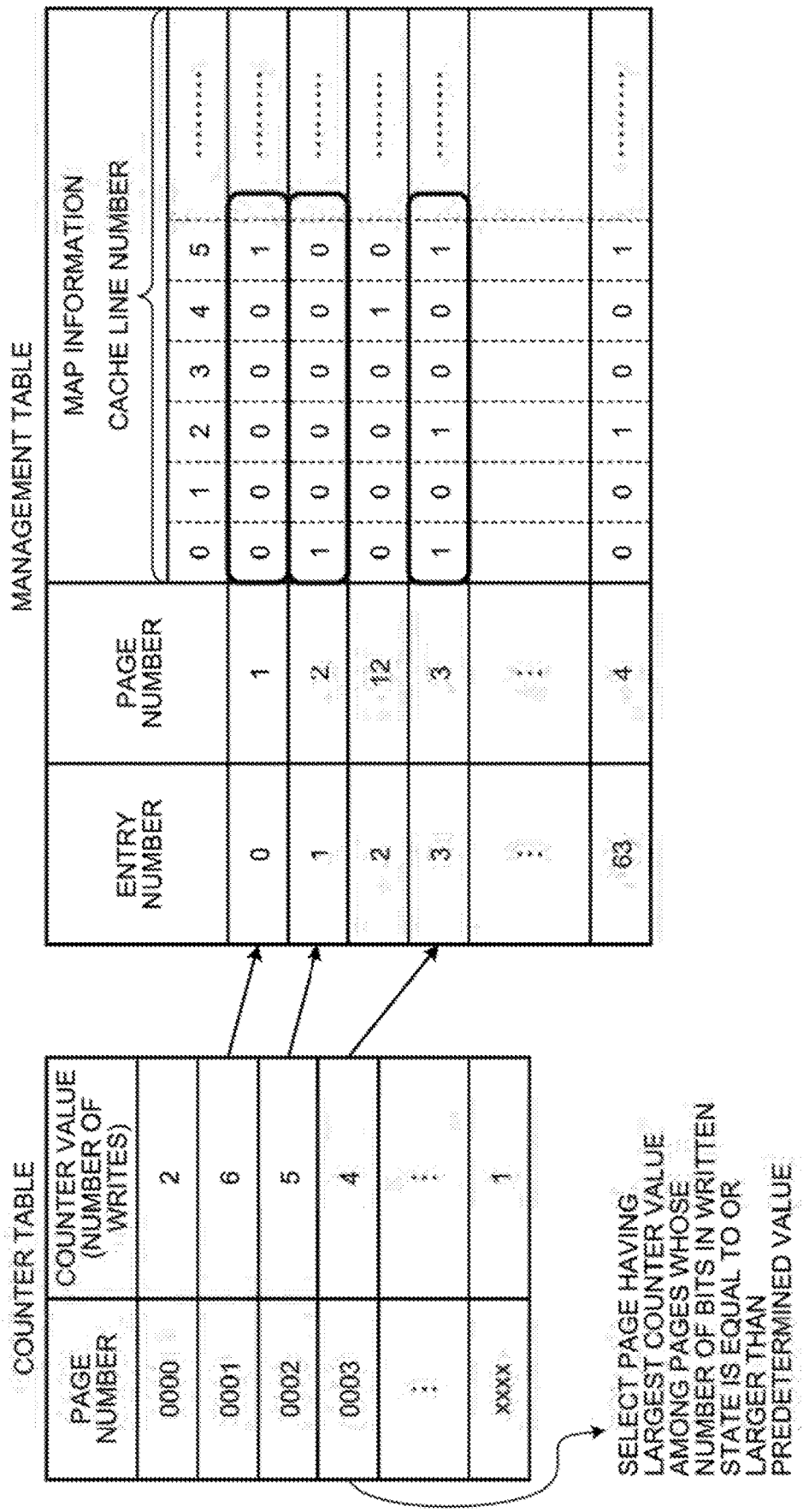
FIG. 23 is a view illustrating an entry with the largest counter value excluding a predetermined page.

FIG. 22 is a flowchart illustrating a fourth example of the process of selecting an exchange target page. FIG. 23 is a view illustrating a page with the largest counter value in the counter table among pages excluding pages in which the number of bits indicating the written state in the management table is smaller than a predetermined value.

The management unit 40 may select an exchange target page according to the flowchart illustrated in FIG. 22. First, in S91, the management unit 40 detects the page having the largest counter value from the counter table.

Next, in S92, the management unit 40 determines whether management information of the detected page is present in the management table. When the management information of the detected page is not present in the management table (No in S92), the management unit 40 causes the processing to proceed to S93. In S93, the management unit 40 detects a page with the next largest counter value from the counter table. Next, the processing returns to S92, and the management unit 40 determines whether the management information of the page with the next largest counter value is present in the management table. Then, the management unit 40 repeats the processes of S92 and S93 until detecting a page with the management information present in the management table.

When the management information of the detected page is present in the management table (Yes in S92), the management unit 40 causes the processing to proceed to S94. In S94, the management unit 40 detects the number of written cache lines for an entry of the detected page in the management table. Next, in S95, the management unit 40 determines whether the detected number of written cache lines is equal to or larger than a predetermined value. When the number of written cache lines is not equal to or larger than the predetermined value (No in S95), the management unit 40 returns the processing to S93 and detects a page which has the management information present in the management table and has the next largest counter value.

When the number of written cache lines is equal to or larger than the predetermined value (Yes in S95), the management unit 40 causes the processing to proceed to S96. In S96, the management unit 40 selects the detected page as an exchange target page. As a result, the management unit 40 can select the page which has the largest counter value as the exchange target page among pages excluding pages with the number of written cache lines (second areas) smaller than the predetermined value in the management table.

For example, in the example of FIG. 23, the management unit 40 selects a page with a page number "0003" as the exchange target page. In the example of FIG. 23, counter values of pages with the page numbers "0001" and "0002" are larger than that of the page with the page number "0003". However, the pages with page numbers "0001" and "0002" are not selected as the exchange target page since the number of written cache lines thereof is smaller than a predetermined value (for example, two).

Next, in S97, the management unit 40 erases the management information of the exchange target page in the management table. Then, in S98, the management unit 40 accesses the counter table and updates a counter value of the exchange target page. The management unit 40 ends this flow when the process of S98 is completed.

Through the above processing, the management unit 40 can select a page having the large number of writes as the exchange target page. However, when there is no writing equal to or larger than a predetermined value at a current timing even if a page has a large number of writes, there is also a possibility that, for example, a request address with a small number of writes is currently allocated to this page that has the large number of writes as a result of performing the wear leveling immediately before the current timing, the management unit 40 does not select this page as the exchange target page. As a result, the management unit 40 can reduce the write amount with respect to the non-volatile memory unit 16 while efficiently using the storage area of the non-volatile memory unit 16.

The process of selecting the exchange target page has keen described as above with reference to FIGS. 16 to 23. The management unit 40 may select an exchange target page using methods other than the above method. For example, the management unit 40 may select a page having the largest multiplied value of the counter value in the counter table and the number of written cache lines (second areas) in the management information as the exchange target page. In addition, the management unit 40 may select the exchange target page out of at least one page whose multiplied value of the counter value in the counter table and the number of written cache lines (second areas) in the management information is equal to or larger than a predetermined value. Even in this manner, the management unit 40 can reduce the write amount with respect to the non-volatile memory unit 16.

As described above, the management device 18 according to the present embodiment selects any one of the exchange target pages set to the second access process out of the plurality of pages included in the non-volatile memory unit 16 and changes the access method of the exchange target page from the second access process to the first access process when the write amount with respect to the non-volatile memory unit 16 is larger than the set value. As a result, when the write amount with respect to the non-volatile memory unit 16 is larger than the set value, it is possible to reduce the write amount with respect to the non-volatile memory unit 16 in the management device 18. Therefore, it is possible to adjust the write amount with respect to the non-volatile memory unit 16 and control the life of the non-volatile memory unit 16 to an appropriate length according to the management device 18.

Second Embodiment

Next, the information processing device 10 according to the second embodiment will be described.

Figure 24:
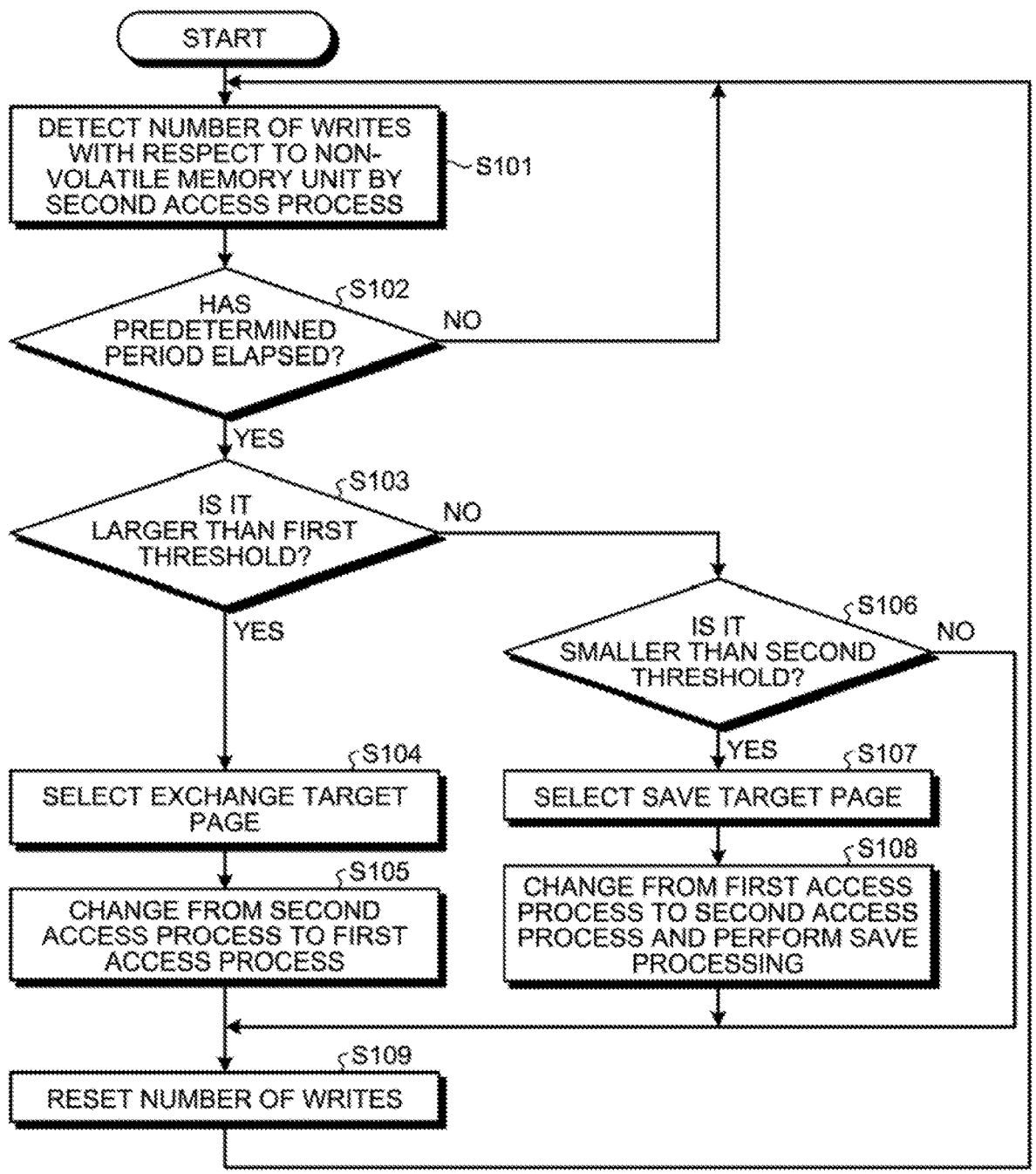
FIG. 24 is a flowchart illustrating processing executed by a management unit according to a second embodiment.

FIG. 24 is a flowchart illustrating processing executed by the management unit 40 according to the second embodiment. In the second embodiment, the management unit 40 executes the processing illustrated in FIG. 24.

First, in S101, the management unit 40 detects the number of writes with respect to the non-volatile memory unit 16 by the second access process. Next, in S102, the management unit 40 determines whether the predetermined period has elapsed. If the predetermined period has not elapsed (No in S102), the management unit 40 continues to execute the detection process of S101. When the predetermined period has elapsed (Yes in S102), the management unit 40 causes the processing to proceed to S103.

In S103, the management, unit 40 determines whether the number of writes with respect to the non-volatile memory unit 16 in the predetermined period is larger than the first threshold set in advance. When the number of writes is larger than the first threshold (Yes in S103), the management unit 40 causes the processing to proceed to S104.

In S104, the management unit 40 selects any page, set to the second access process among the plurality of pages included in the non-volatile memory unit 16, as an exchange target page. Incidentally, the process of selecting an exchange target page is the same as that of the first embodiment.

Next, in S105, the management unit 40 accesses the conversion table and changes the access method of the selected exchange target page from the second access process to the first access process. When S105 is completed, the management unit 40 causes the processing to proceed to S109.

In addition, when the number of writes is not larger than the first threshold (No in S103), the management unit 40 causes the processing to proceed to S106. In S106, the management unit 40 determines whether the number of writes with respect to the non-volatile memory unit 16 in the predetermined period is smaller than a second threshold set in advance. The second threshold is smaller than the first threshold.

When the number of writes is not smaller than the second threshold (No in S106), the management unit 40 causes the processing to proceed to S109. When the number of writes is smaller than the second threshold (Yes in S106), the management unit 40 causes the processing to proceed to S107.

In S107, the management unit 40 selects any page, set to the first access process, as a save target page. For example the management unit 40 selects a page having the smallest number of accesses among pages for which data has been copied in the first memory unit 14 as the save target page. Instead the management unit 40 may select the oldest page (page for which the longest time has elapsed since the access thereof) among the pages for which data has been copied in the first memory unit 14 as the save target page.

Next, in S108, the management unit 40 accesses the conversion table and changes the access method of the selected save target page from the first access process to the second access process. In addition, the management unit 40 performs a process of saving the save target page. Specifically, the management unit 40 transfers data of the save target page in the first memory unit 14 to an original page (or an empty page) in the non-volatile memory unit 16. Furthermore, the management unit 40 accesses the conversion table and changes a page number of the save target page to a page number after the transfer. When S108 is completed, the management unit 40 causes the processing to proceed to S109.

Finally, in S109, the management unit 40 resets the number of writes to zero, for example, and returns the processing to S101. As a result, the management unit 40 can detect the number of writes with respect to the non-volatile memory unit 16 in the next predetermined period. Then, the management unit 40 executes processing from S101 to S109 in the next predetermined period.

In this manner, the management unit 40 can detect the number of writes with respect to the non-volatile memory unit 16 every predetermined period. Then, when the number of writes in the predetermined period is larger than the first threshold, the management unit 40 can change the access method of the exchange target page from the second access process to the first access process. Furthermore, when the number of writes in the predetermined period is smaller than the second threshold, the management unit 40 can change the accessing method of the save target page from the first access process to the second access process.

Figure 25:
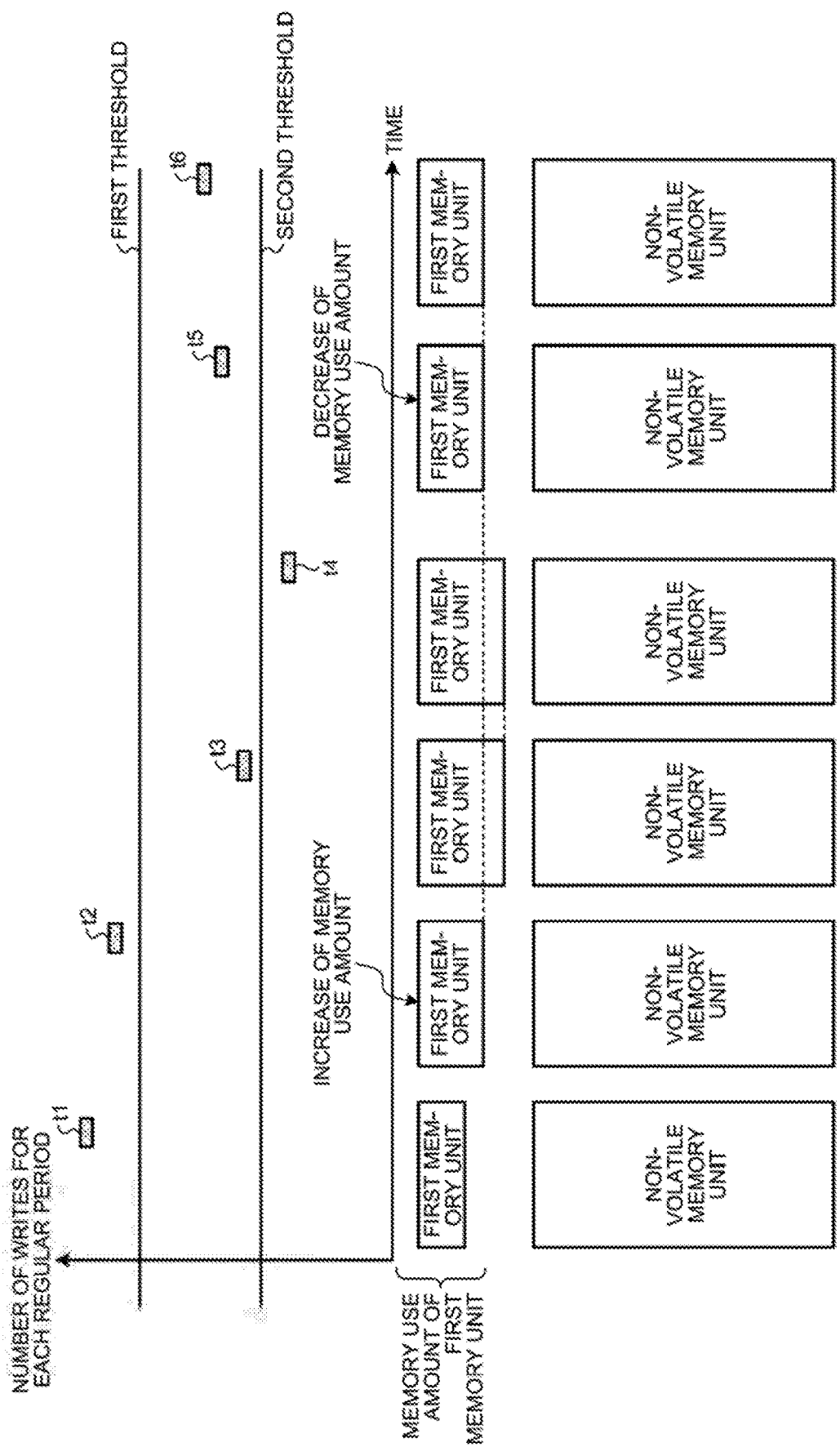
FIG. 25 is a view illustrating an example of a change of a memory use amount of a first memory unit according to the second embodiment.

FIG. 25 is a view illustrating an example of a change of a memory use amount of the first memory unit 14 according to the second embodiment. As illustrated in FIG. 25, the management unit 40 detects the number of writes with respect to the non-volatile memory unit 16 every predetermined period.

For example, when the number of writes is larger than the first threshold as in time t1 and time t2, the management unit 40 changes the access method of same pages from the second access process to the first access process. As a result, the management unit 40 can increase the memory use amount of the first memory unit 14. In other words, the management unit 40 can lengthen the life of the non-volatile memory unit 16 in exchange for the use cost (for example, power consumption) of the first memory unit 14.

In addition, for example, when the number of writes is smaller than the second threshold as in time t4, the management unit 40 changes the access method of some pages from the first access process to the second access process. As a result, the management unit 40 can decrease the memory use amount of the first memory unit 14. In other words, the management unit 40 can reduce the use cost (for example, power consumption) of the first memory unit 14 within a range not significantly affecting the life of the non-volatile memory unit 16.

Then, the management unit 40 does not change the access method of any page when the number of writes is between the first threshold and the second threshold as in time t3, time t5, and time t6. As a result, the management unit 40 can set the memory use amount of the first memory unit 14 not to be changed.

In this manner, the management device 18 according to the second embodiment controls the access method (that is, the memory use amount of the first memory unit 14) such that the number of writes with respect to the first memory unit 14 is within a certain range. As a result, it is possible to control the life of the non-volatile memory unit 16 to an appropriate length and to reduce the use cost of the first memory unit 14 according to the management device 18 of the second embodiment.

Third Embodiment

Next, the information processing device 10 according to a third embodiment will be described.

Figure 26:
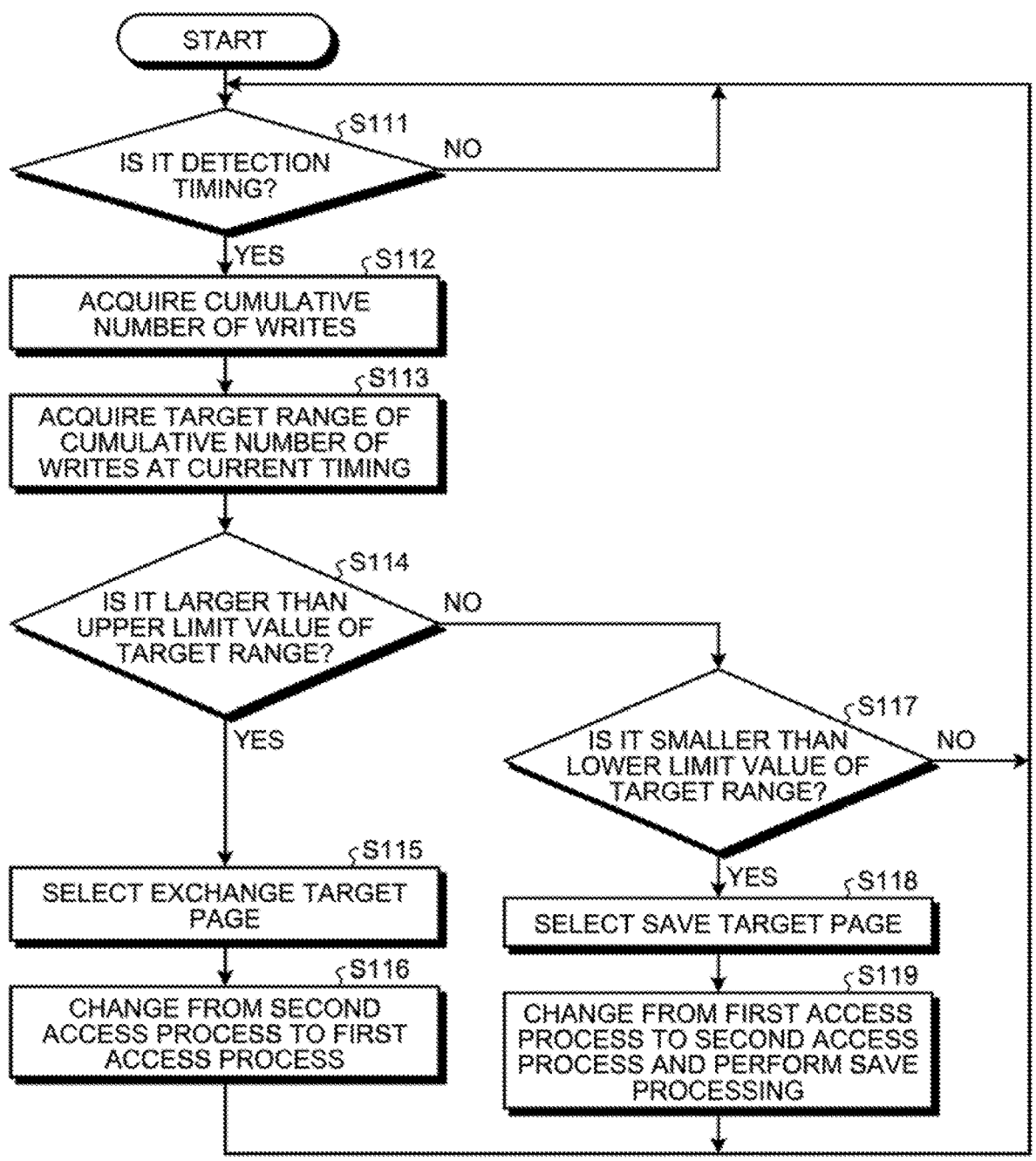
FIG. 26 is a flowchart illustrating processing executed by a management unit according to a third embodiment.

FIG. 26 is a flowchart illustrating processing executed by the management unit 40 according to the third embodiment. In the third embodiment, the management unit 40 executes the processing illustrated in FIG. 26.

First, in S111, the management unit 40 determines whether it is a detection timing. For example, the management unit 40 may determine whether a predetermined period has elapsed. When it is not the detection timing (No in S111), the management unit 40 causes the processing to stand by in S111. When it is the detection timing (Yes in S111), the management unit 40 causes the processing to proceed to S112.

Next, in S112, the management unit 40 detects the largest cumulative number of writes with respect to the non-volatile memory unit 16 by the second access process. For example, the management unit 40 detects the number of writes of a page for which writing has been performed the most until the current timing since shipping of the management device 18 from the factory. In the present embodiment, the management unit 40 refers to the counter table and acquires the largest counter value.

Next, in S113, the management unit 40 acquires an upper limit value and a lower limit value of a target range. The upper limit value and the lower limit value of the target range have minimum values at the time of shipping of the management device 18 from the factory and increase as the operation time since the shipping from the factory becomes longer. For example, the management unit 40 multiplies an elapsed time from the shipping from the factory by a predetermined value (target number of writes per unit time) to calculate the target number of writes at the current timing. Then, the management unit 40 adds a predetermined margin value to the target number of writes at the current timing to calculate the upper limit value, and subtracts a predetermined margin value from the target number of writes at the current timing to calculate the lower limit value.

Next, in S114, the management unit 40 determines whether the cumulative number of writes (for example, the largest counter value) is larger than the upper limit value of the target range. When the cumulative number of writes is larger than the upper limit value (Yes in S114), the management unit 40 causes the processing to proceed to S115.

In S115, the management unit 40 selects any page, set to the second access process among the plurality of pages included in the non-volatile memory unit 16, as an exchange target page. Incidentally, the process of selecting an exchange target page is the same as that of the first embodiment.

Next, in S116, the management unit 40 accesses the conversion table and changes the access method of the selected exchange target page from the second access process to the first access process. When S116 is completed, the management unit 40 returns the processing to S111.

In addition, when the cumulative number of writes is not larger than the upper limit value (No in S114), the management unit 40 causes the processing to proceed to S117. In S117, the management unit 40 determines whether the cumulative number of writes is smaller than the lower limit value of the target range.

When the cumulative number of writes is not smaller than the lower limit value of the target range (No in S117), the management unit 40 returns the processing to S111. When the cumulative number of writes is smaller than the lower limit value of the target range (Yes in S117), the management unit 40 causes the processing to proceed to S118.

In S118, the management unit 40 selects any page, set to the first access process, as a save target page. A method of selecting the save target page is the same as that of the second embodiment.

Next, in S119, the management unit 40 accesses the conversion table and changes the access method of the selected save target page from the first access process to the second access process. In addition, the management unit 40 performs a process of saving the save target page. Specifically, the management unit 40 transfers data of the save target page in the first memory unit 14 to an original page (or an empty page) in the non-volatile memory unit 16. Furthermore, the management unit 40 accesses the conversion table and changes a page number of the save target page to a page number after the transfer. When S119 is completed, the management unit 40 returns the processing to S111.

Then, when the processing returns to S111, the management unit 40 executes processing from S111 to S119 in the next predetermined period.

In this manner, the management unit 40 can detect the number of writes (for example, the largest counter value) in the page for which writing has been performed the most every predetermined period. Then, when the cumulative number of writes is larger than the upper limit value of the target range, the management unit 40 can change the access method of the exchange target page from the second access process to the first access process. Furthermore, when the cumulative number of writes is smaller than the lower limit value of the target range, the management unit 40 can change the access method of the save target page from the first access process to the second access process.

Figure 27:
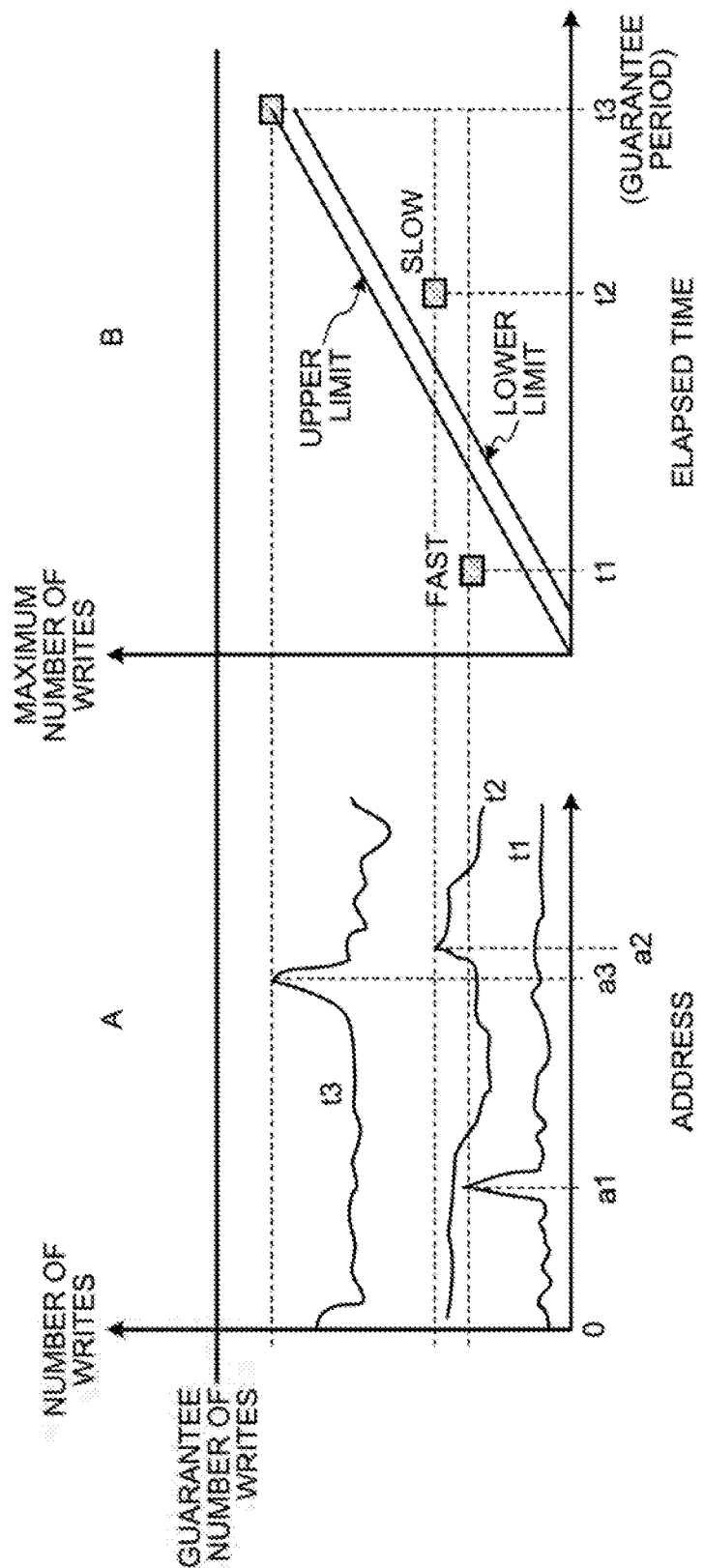
FIG. 27 is a graph illustrating the number of writes for each address and the largest number of writes.

FIG. 27 is a graph illustrating the number of writes for each address in the non-volatile memory unit 16 and the largest number of writes for each elapsed time.

As illustrated in A of FIG. 27, the non-volatile memory unit 16 has variations in the number of writes for each page (for each address). For example, when writing is performed locally in the non-volatile memory unit 16, the number of writes of a specific page increases. In the example of A in FIG. 27, the number of writes of a page with an address a1 becomes the largest at time t1, the number of writes of a page with an address a2 becomes the largest at time t2, and the number of writes of a page with an address a3 becomes the largest at time t3.

Until reaching a guarantee period of the non-volatile memory unit 16, the management unit 40 needs to manage writing with respect to the non-volatile memory unit 16 such that the largest number of writes does not exceed a guarantee number of times. Therefore, when the largest number of writes (the largest counter value) is larger than the upper limit value of the preset target range every predetermined period, the management unit 40 changes the access method of the exchange target page from the second access process to the first access process.

For example, when increasing pace of the largest number of writes is faster than preset pace as at time t1 in B of FIG. 27, the management unit 40 changes the access method of the exchange target page from the second access process to the first access process. As a result, the increasing pace of the number of writes with respect to the non-volatile memory unit 16 decreases. Therefore, the management unit 40 can manage the writing with respect to the non-volatile memory unit 16 such that the largest number of writes does not exceed the guarantee number of times before reaching the guarantee period.

Meanwhile, it is desirable that the management unit 40 control the writing with respect to the non-volatile memory unit 16 so as to reduce the memory use amount of the first memory unit 14 as much as possible to reduce power consumption caused by the memory access. Therefore, the management unit 40 manages the writing with respect to the non-volatile memory unit 16 such that the number of writes with respect to the non-volatile memory unit 16 is maximized within an allowable range. Therefore, when the largest number of writes is smaller than the lower limit value of the preset target range every predetermined period, the management unit 40 changes the access method of the save target page from the first access process to the second access process.

For example, when increasing pace of the largest number of writes is slower than preset pace as at time t2 in B of FIG. 27, the management unit 40 changes the access method of the save target page from the first access process to the second access process. As a result, the increasing pace of the number of writes with respect to the non-volatile memory unit 16 increases. Therefore, the management unit 40 can manage the writing with respect to the non-volatile memory unit 16 such that the number of writes with respect to the non-volatile memory unit 16 is maximized within an allowable range. As a result, the management unit 40 can reduce the memory use amount of the first memory unit 14.

Fourth Embodiment

Next, the information processing device 10 according to a fourth embodiment will be described.

Figure 28:
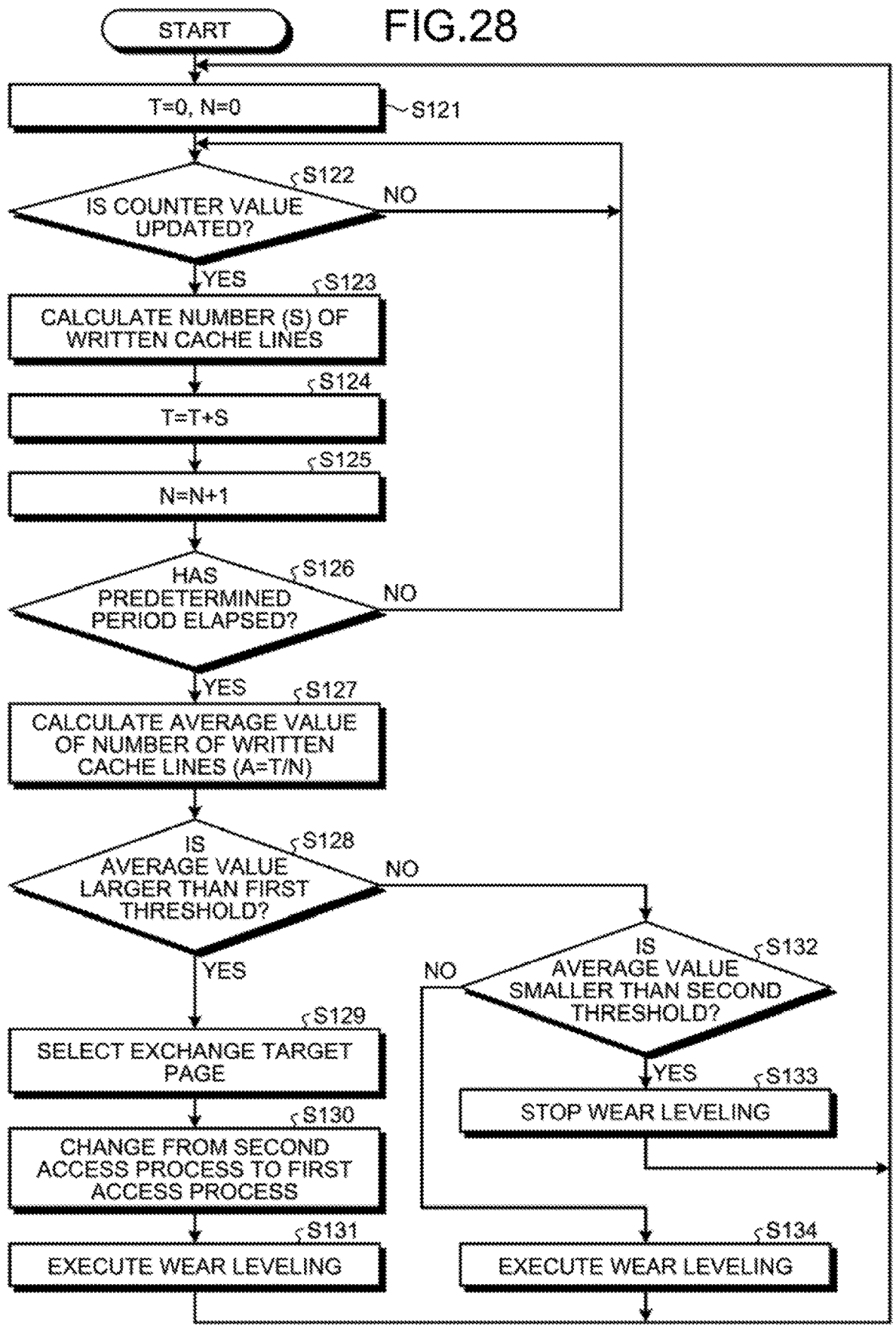
FIG. 28 is a flowchart illustrating processing executed by a management unit according to a fourth embodiment.

FIG. 28 is a flowchart illustrating processing executed by the management unit 40 according to the fourth embodiment. In the fourth embodiment, the management unit 40 executes the processing illustrated in FIG. 28.

First, in S121, the management unit 40 initializes variables T and N to zero. Incidentally, T represents the cumulative number of written cache lines within a predetermined period. In addition, N represents the number of pages for which a counter value has been updated within the predetermined period.

Next, in S122, the management unit 40 determines whether a counter value in any page is to be updated, that is, whether the counter value is to be incremented. When the counter value is not to be updated (No in S122), the management unit 40 causes the processing to stand by in S122. When the counter value is to be updated (Yes in S122), the management unit 40 causes the processing to proceed to S123.

In S123, the management unit 40 refers to the management table and detects the number (S) of written cache lines included in an entry of a page to be updated immediately before updating the counter value. Incidentally, the number of written cache lines represents a size of the written area in the page. Therefore, in S123, the management unit 40 detects the size of the written area included in the page to be updated immediately before updating the counter value.

Next, in S124, the management unit 40 adds the number (S) of written cache lines to T. As a result, the management unit 40 can calculate a cumulative number of written cache lines. Next, in S125, the management unit 40 adds one to N. As a result, the management unit 40 can calculate a cumulative number of pages for which the counter value has been updated.

Next, in S126, the management unit 40 determines whether the predetermined period has elapsed. If the predetermined period has not elapsed (No in S126), the management unit 40 returns the processing to S122 and causes the processing to stand by until the counter value is next updated. When the predetermined period has elapsed (Yes in S126), the management unit 40 causes the processing to proceed to S127.

In S127, the management unit 40 calculates an average value of the number of written cache lines in the predetermined period. That is, the management unit 40 calculates the average value of the sizes of the written areas included in the page to be updated in the predetermined period. In the present example, the management unit 40 calculates T/N to calculate the average value (A).

Next, in S128, the management unit 40 determines whether the average value is larger than the first threshold set in advance. When the average value is larger than the first threshold (Yes in S128), the management unit 40 causes the processing to proceed to S129.

In S129, the management unit 40 selects any page, set to the second access process among the plurality of pages included in the non-volatile memory unit 16, as an exchange target page. Incidentally, the process of selecting an exchange target page is the same as that of the first embodiment.

Next, in S130, the management unit 40 accesses the conversion table and changes the access method of the selected exchange target page from the second access process to the first access process. Next, in S131, when the wear leveling process executed by the wear leveling execution unit 38 is stopped, the management unit 40 starts execution of the wear leveling. When S131 is completed, the management unit 40 returns the processing to S121.

In addition, when the average value is not larger than the first threshold (No in S128), the management unit 40 causes the processing to proceed to S132. In S132, the management unit 40 determines whether the average value is smaller than a second threshold set in advance.

When the average value is smaller than the second threshold (Yes in S132), the management unit 40 causes the processing to proceed to S133. In S133, the management unit 40 stops the wear leveling process executed by the wear leveling execution unit 38. When the process of S133 is completed, the management unit 40 returns the processing to S121.

When the average value is not smaller than the second threshold (No in S131), the management unit 40 causes the processing to proceed to S134. In S134, when the wear leveling process executed by the wear leveling execution unit 38 is stopped, the management unit 40 starts the execution of wear leveling. When S134 is completed, the management unit 40 returns the processing to S121. Then, when the processing returns to S121, the management unit 40 executes processing from S121 to S134 in the next predetermined period.

In this manner, the management unit 40 can detect the number of written cache lines in the page to be updated at the time of updating the counter value. That is, the management unit 40 can detect the size of the written area in the page to be updated at the time of updating the counter value. Furthermore, the management unit 40 can calculate the average value of the sizes of the written areas in the page to be updated every predetermined period. Then, when the average value is larger than the first threshold, the management unit 40 can change the access method of the exchange target page from the second access process to the first access process. Furthermore, when the average value is smaller than the second threshold, the management unit 40 can stop the execution of wear leveling.

Figure 29:
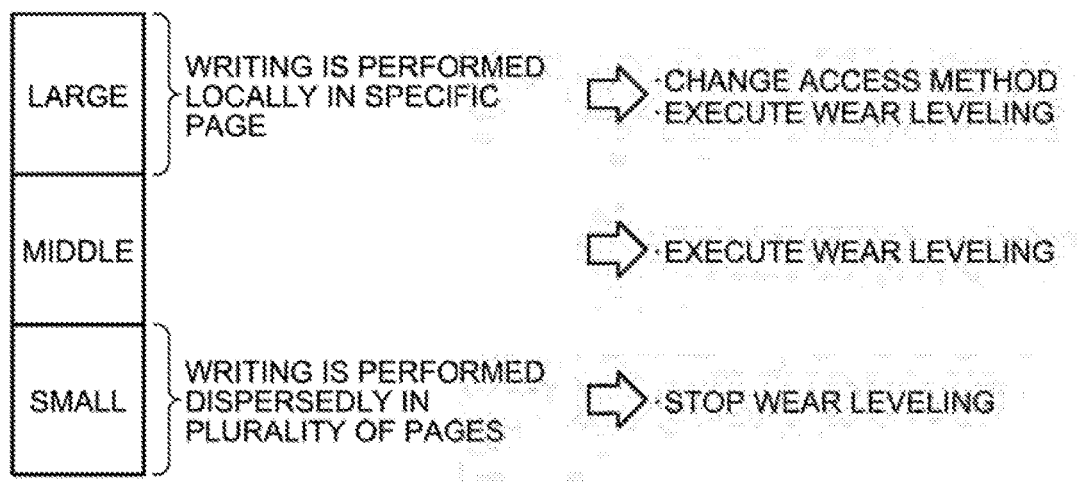
FIG. 29 is a view for describing processing to be executed in the fourth embodiment.

FIG. 29 is a view for describing processing to be executed in the fourth embodiment. The number of written cache lines in the page to be updated at the time of updating the counter value represents the size of the written area in the page. When the average value of the sizes of the written areas in the page is relatively large, writing is performed locally for a specific page in the non-volatile memory unit 16.

Therefore, when the average value, of the sizes of the written areas included in the page to be updated immediately before updating the counter value is larger than the first, threshold, the management unit 40 changes the access method of the exchange target page from the second access process Change to the first access process. As a result, the management unit 40 can store the locally accessed data in the first memory unit 14 and extend the life of the non-volatile memory unit 16.

On the contrary, when the average value of the sizes of the written areas in the page is relatively small, writing is performed dispersedly for the plurality of pages in the non-volatile memory unit 16. Therefore, when the average value of the sizes of the written areas in the page is relatively small, it is estimated that writing is performed in the non-volatile memory unit 16 for each page on average even without executing the wear Leveling process.

Therefore, when the average value of the sizes of the written areas included in the page to be updated immediately before updating the counter value is smaller than the second threshold, the management unit 40 steps the wear leveling process. As a result, the management unit 40 can efficiently use the non-volatile memory unit 16 by eliminating unnecessary writing by the wear leveling process.

Fifth Embodiment

Next, the information processing device 10 according to a fifth embodiment will be described.

Figure 30:
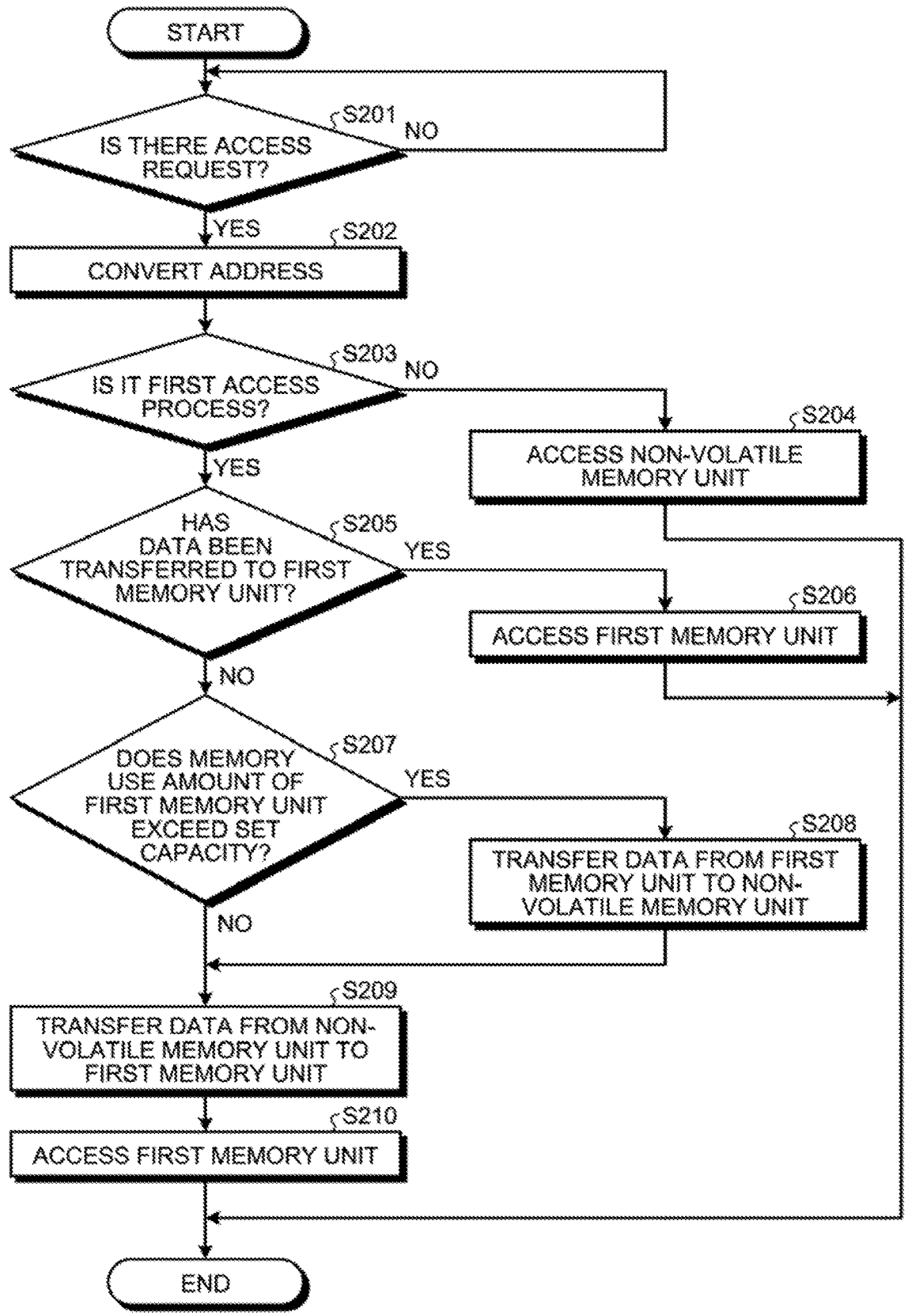
FIG. 30 is a flowchart illustrating an access process according to a fifth embodiment.

FIG. 30 is a flowchart illustrating the access process using the access processing unit 28 according to the fifth embodiment. The access processing unit 28 according to the fifth embodiment accesses the first memory unit 14 and the non-volatile memory unit 16 in accordance with the flowchart illustrated in FIG. 30.

First, in S201, the access processing unit 28 determines whether the access request has been issued from the processing circuit 12. When there is no access request (No in S201), the access processing unit 28 stands by in S201. When there is the access request (Yes in S201), the access processing unit 28 causes the processing to proceed to S202.

In S202, the access processing unit 28 refers to the conversion table and specifies a page number of a target page to be an access destination in the first memory unit 14 or the non-volatile memory unit 16 based on a request address included in the access request. As a result, the access processing unit 28 can execute a process of converting an address from the request address to a physical address.

Next, in S203, the access processing unit 28 determines whether an access method with respect to the target page is the first access process. When the access method with respect to the target page is not the first access process, that is, when the access method is the second access process (No in S203), the access processing unit 28 causes the processing to proceed to S204. In S204, the access processing unit 28 directly accesses the target page in the non-volatile memory unit 16. Then, the access processing unit 28 ends this flow when the process of S204 is completed.

In addition, when the access method with respect to the target page is the first access process (Yes in S203), the access processing unit 28 causes the processing to proceed to S205. In S205, the access processing unit 28 determines whether data has been transferred or not beer, transferred to the first memory unit 14. The access processing unit 28 can determine whether data has been transferred or not been transferred to the first memory unit 24 by referring to the page number (physical address) in the conversion table.

If the transfer has been completed (Yes in S205), the access processing unit 28 causes the processing to proceed to S206. In S206, the access processing unit 28 accesses the target page in the first memory unit 14. Then, the access processing unit 28 ends this flow when the process of S206 is completed.

If the transfer has not been completed (No in S205), the access processing unit 28 causes the processing to proceed to S207. In S207, the access processing unit 28 transfers data from the non-volatile memory unit 16 to the first memory unit 14 in order to perform the first access process, thereby determining whether a memory use amount of the first memory unit 14 exceeds a set capacity.

When the memory use amount of the first memory unit 14 exceeds the set capacity (Yes of S207), the access processing unit 28 causes the processing to proceed to S208. When the memory use amount of the first memory unit 14 does not exceed the set capacity (No in S207), the access processing unit 28 causes the processing to proceed to S209.

In S208, the access processing unit 28 returns a part of data, which has been transferred to the first memory unit 14, to the non-volatile memory unit 16. For example, the access processing unit 28 returns a predetermined number of pages starting from a page having a smaller number of accesses among pages for which data has been copied in the first memory unit 14, to the non-volatile memory unit 16. In addition, for example, the access processing unit 28 returns a predetermined number of pages starting from the oldest page (the predetermined number of pages for which the longest time has elapsed since the access thereof) among the pages for which data has been copied in the first memory unit 14, to the non-volatile memory unit 16. In addition, the access processing unit 28 changes the page number (physical address) of the transferred data in the conversion table to a page number of a transfer destination in the non-volatile memory unit 16. Upon completion of the processing of S208, the access processing unit 28 causes the processing to proceed to S209.

In S209, the access processing unit 28 transfers the data of the target page from the non-volatile memory unit 16 to the first memory unit 14. In addition, the access processing unit 28 changes the page number (physical address) of the transferred data in the conversion table to a page number of a transfer destination in the first memory unit 14. Upon completion of the processing of S209, the access processing unit 28 causes the processing to proceed to S210.

In S210, the access processing unit 28 accesses the target page in the first memory unit 14. Then, the access processing unit 28 ends this flow when the process of S204, S206, or S210 is completed.

By executing the processing as described above, the access processing unit 28 can access the first memory unit 14 and the non-volatile memory unit 16 according to the access method indicated in the conversion table. In addition, the access processing unit 28 can suppress the memory use amount of the first memory unit 14 to be equal to or smaller than the set capacity.

Figure 31:
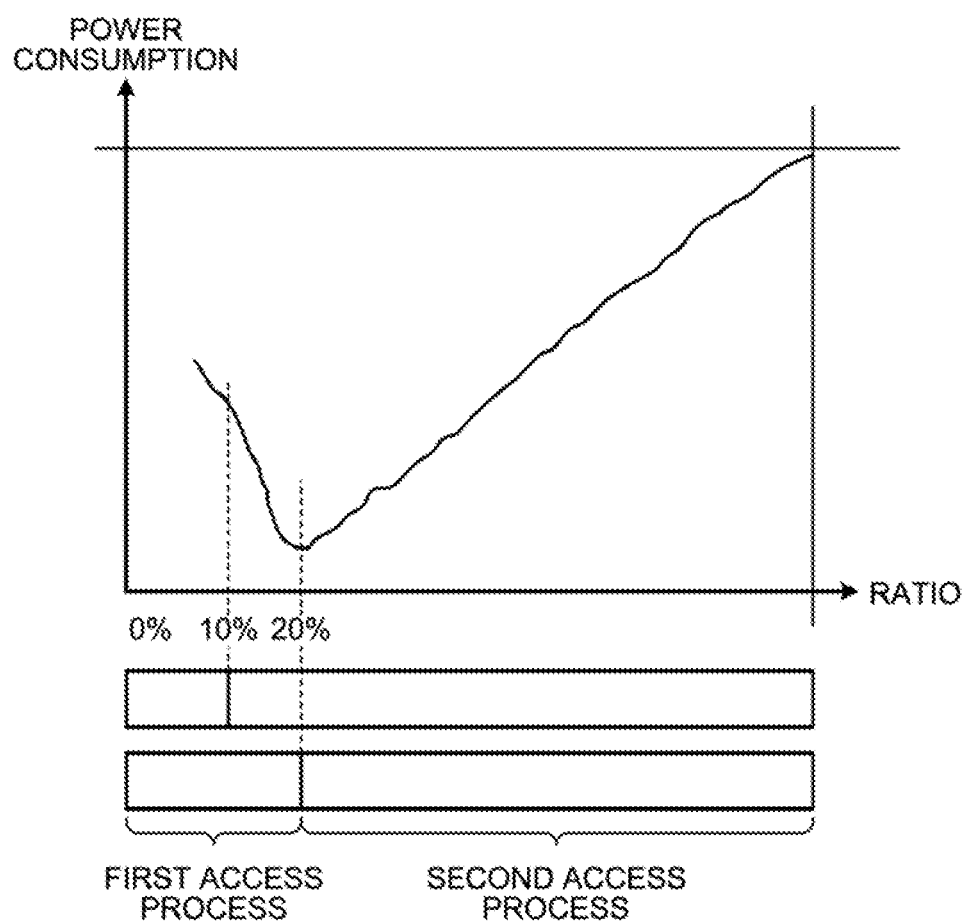
FIG. 31 is a graph illustrating an estimated value of power consumption by memory access.

FIG. 31 is a graph illustrating an estimated value of power consumption caused by the memory access with respect to a ratio between the number of pages set to the first access process and the number of pages set to the second access process.

When the page set to the first access process has been stored in the first memory unit 14 (Yes in S205 of FIG. 30), the access processing unit 28 does not execute data transfer from the non-volatile memory unit 16 to the first memory unit 14. Therefore, when the page set to the first access process has been repeatedly accessed, the power consumption caused by the data transfer is reduced, so that the power consumption caused by the memory access is reduced.

However, the access processing unit 28 performs a process of writing data from the first memory unit 14 back to the non-volatile memory unit 16 such that the memory use amount of the first memory unit 14 does not exceed the set capacity (process of S208 in FIG. 30). Therefore, if there are too many pages set to the first access process, the power consumption caused by the memory access reversely increases.

For example, as illustrated in FIG. 31, when the ratio between the number of pages set to the first access process and the number of pages set to the second access process is a predetermined value (for example, a position of about 20% in FIG. 31), it is estimated that the power consumption caused by the memory access is minimized.

It is presumed that the power consumption caused by the memory access is minimized in a state where the memory use amount of the first memory unit 14 does not exceed the set capacity and the memory use amount of the first memory unit 14 is as large as possible.

Therefore, the management unit 40 according to the fifth embodiment detects the memory use amount of the first memory unit 14, increases the set value (for example, the first threshold) when the detected memory use amount is larger than the upper limit of the preset range, and decreases the set value (for example, the first threshold) when the memory use amount is smaller than the preset range. As a result, the management unit 40 can reduce the power consumption caused by the memory access by controlling the memory use amount of the first memory unit 14 to such a state of not exceeding the set capacity and being as large as possible.

FIG. 32 is a flowchart illustrating a process of changing the first threshold by the management unit 40 according to the fifth embodiment. In the fifth embodiment, the management unit 40 changes the first threshold used in S53 of FIG. 14, S103 of FIG. 24, and S128 of FIG. 28 according to the flowchart illustrated in FIG. 32.

First, in S221, the management unit 40 acquires the memory use amount of the first memory unit 14. Next, in S222, the management unit 40 determines whether the acquired memory use amount is larger than the upper limit of the set range. When the memory use amount is larger than the upper limit of the set range (Yes in S222), the management unit 40 causes the processing to proceed to S223. When the memory use amount is not larger than the upper limit of the set range (No in S222), the management unit 40 causes the processing to proceed to S224.

In S223, the management unit 40 increases the first threshold by a predetermined amount. As a result, the management unit 40 can decrease the number of pages for which the change from the second access process to the first access process occurs. The management unit 40 ends this flow when the process of S223 is completed.

In S224, the management unit 40 determines whether the acquired memory use amount is smaller than the lower limit of the set range. When the memory use amount is smaller than the lower limit of the set range (Yes in S224), the management unit 40 causes the processing to proceed to S225. When the memory use amount is not smaller than the lower limit of the set range (No in S224), the management unit 40 ends this flow.

In S225, the management unit 40 decreases the first threshold by a predetermined amount. As a result, the management unit 40 can increase the number of pages for which the change from the second access process to the first access process occurs. The management unit 40 ends this flow when the process of S225 is completed.

By executing the above processing, the management unit 40 can increase the set value (first threshold) when the memory use amount is larger than the upper limit of the set range, and decrease the set value (first threshold) when the memory use amount is smaller than the set range. As a result, the management unit 40 can suppress the power consumption caused by the memory access by setting the memory use amount of the first memory unit 14 to such a state of not exceeding the set capacity and being as large as possible.

Modifications

Next, modifications of the respective embodiments will be described.

FIG. 33 is a view illustrating a modification of the identification information. The management device 18 identifies the management information stored in the management table using the page number. Instead, the management device 18 may identify management information stored in the management table in association with an address managed by a translation lookaside buffer (TLB).

The processing circuit 12 has a virtual storage mechanism referred to as the TLB. The TLB stores correspondence information indicating a correspondence between a request address (logical address) and a physical address on a page in order to perform address conversion from a virtual address to the physical address. However, the entries held by the TLB are limited, and thus, the TLB replaces the correspondence information as necessary. For example, the TLB preferentially stores correspondence information on a page accessed with a high frequency lately.

Therefore, the management device 18 may store a page for which the correspondence information is stored in the TLB in the management table. For example, the management device 18 stores the management table having the same number of entries as the number of entries of the TLB. Then, the update unit 36 erases the management information stored in the corresponding management table at a timing when the correspondence information is taken out of the entry of the TLB. In this case, the update unit 36 executes the same processing as that of a case where the management information has been written in another management information. Incidentally, the management table has the same entries as the entries of the TLB, and thus, does not necessarily include an entry for storing identification information.

By storing the management information in the management table in this manner, the management device 18 can efficiently manage the number of writes for each page necessary for wear leveling in synchronization with the processing circuit 12.

Figure 34:
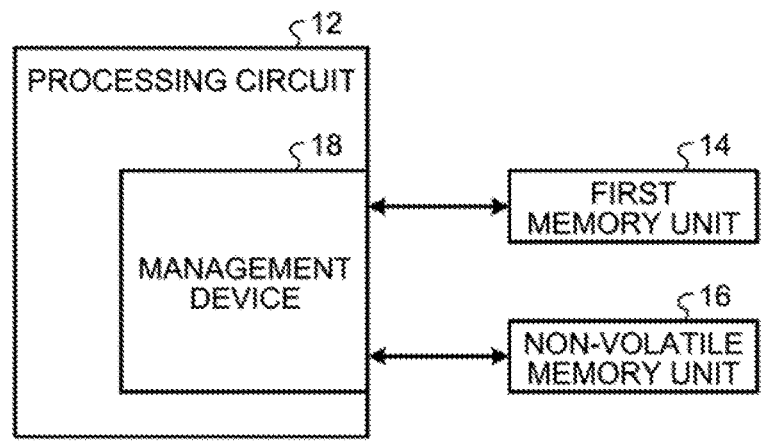
FIG. 34 is a diagram illustrating a first modification of the configuration of the information processing device.

FIG. 34 is a diagram illustrating a first modification of the configuration of the information processing device 10. For example, the processing circuit 12 according to the first modification includes the management device 18 therein. The first memory unit 14 and the non-volatile memory unit 16 according to the first modification are provided outside the processing circuit 12.

Figure 35:
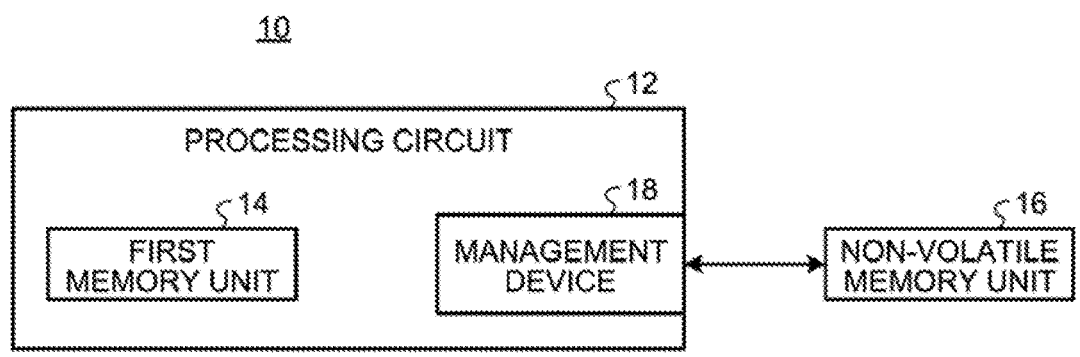
FIG. 35 is a diagram illustrating a second modification of the configuration of the information processing device.

FIG. 35 is a diagram illustrating a second modification of the configuration of the information processing device 10. For example, the processing circuit 12 according to the second modification includes the management device 18 therein. The processing circuit 12 according to the second modification also includes the first memory unit 14 therein.

Figure 36:
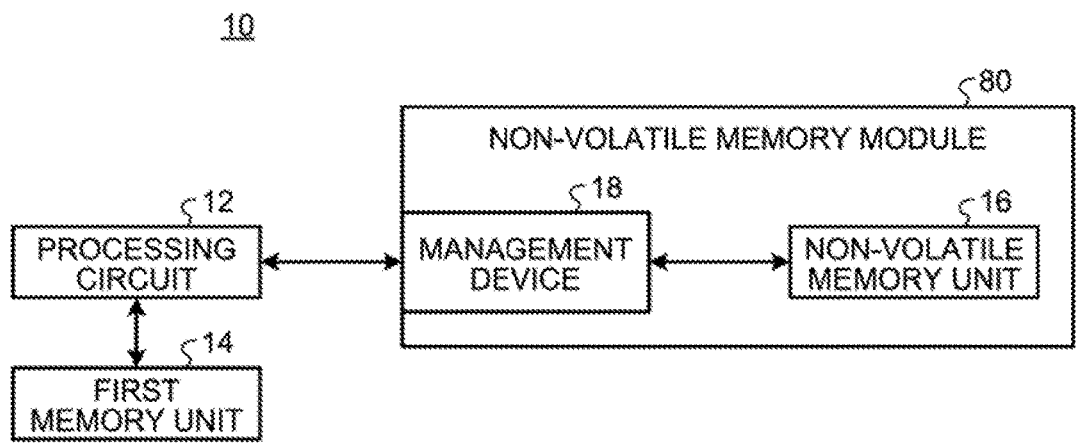
FIG. 36 is a diagram illustrating a third modification of the configuration of the information processing device.

FIG. 36 is a diagram illustrating a third modification of the configuration of the information processing device 10.

For example, the information processing device 10 may include the processing circuit 12 and a non-volatile memory module 80. In this case, the non-volatile memory module 80 includes the non-volatile memory unit 16 and the management device 18.

In addition, the first memory unit 14 may be, for example, a static random access memory (SHAM) in a processor. In addition, the first memory unit 14 may be a non-volatile memory such as an MRAM with the number of writable times larger than that of the non-volatile memory unit 16.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A management device configured to control reading and writing of data by a processing circuit with respect to a first memory and a non-volatile memory including a plurality of pages, the management device comprising:
    a setting memory configured to store an access method indicating which of a first access process of performing writing or reading with respect to data transferred from the non-volatile memory to the first memory, or a second access process of directly performing writing or reading with respect to data stored in the non-volatile memory, is to be executed for each of the plurality of pages; and
    circuitry configured to:
        execute the first access process when receiving a write or read request with respect to a page set to the first access process, and execute the second access process when receiving a write or read request with respect to a page set to the second access process, and
        select any page set to the second access process among the plurality of pages, as an exchange target page, when a write amount with respect to the non-volatile memory is larger than a set value, and change an access method of the exchange target page from the second access process to the first access process.

2. The device according to claim 1, wherein the circuitry detects a number of writes with respect to the non-volatile memory every predetermined period and changes the access method of the exchange target page from the second access process to the first access process when the number of writes in the predetermined period is larger than a first threshold which is the set value.

3. The device according to claim 2, wherein when the number of writes in the predetermined period is smaller than a second threshold which is smaller than the first threshold, the circuitry selects any page set to the first access process among the plurality of pages, as a save target page, and changes an access method of the save target page from the first access process to the second access process.

4. The device according to claim 1, wherein the circuitry detects a page whose number of writes is largest, and changes the access method of the exchange target page from the second access process to the first access process when the number of writes is larger than an upper limit of a target range which is the set value.

5. The device according to claim 1, further comprising:
a counter memory configured to store a counter value indicating a number of writes with respect to a page for each of the plurality of pages; wherein
the circuitry is further configured to execute wear leveling with respect to the non-volatile memory based on the counter value for each of the plurality of pages.

6. The device according to claim 5, wherein the circuitry:
detects a size of a written area included in a page to be updated immediately before updating the counter value every time the counter value is updated,
calculates an average value of sizes of the detected written areas every predetermined period, and changes the access method of the exchange target page from the second access process to the first access process when the average value is larger than a first threshold which is the set value.

7. The device according to claim 6, wherein the circuitry stops wear leveling when the average value is smaller than a second threshold which is smaller than the first threshold.

8. The device according to claim 1, wherein
when a memory use amount of the first memory exceeds a set capacity by transferring data from the non-volatile memory to the first memory to perform the first access process, the circuitry returns a part of data already transferred to the first memory to the non-volatile memory, and
the circuitry increases the set value when the memory use amount is larger than an upper limit of a preset range and decreases the set value when the memory use amount is smaller than the preset range.

9. The device according to claim 1, wherein
each of the plurality of pages includes a plurality of second areas,
the management device further comprises:
    a counter memory configured to store a counter value indicating a number of writes for each of the plurality of pages; and
    a management information memory configured to store a management table capable of storing management information for each of a predetermined number of pages smaller than the plurality of pages, wherein
    the circuitry is further configured to update the counter value and the management table,
the management information indicates whether each of the plurality of second areas included in a corresponding page has been written or unwritten, wherein
in response to writing of first data with respect to the non-volatile memory, the circuitry:
    changes a state of a target second area which is a second area to which the first data is to be written, to a written state when the state of the target second area is an unwritten state, the state being indicated by the management information on a target page that is a page to which the first data is to be written; and
    changes the state of the target second area to the written state, changes states of areas other than the target second area to the unwritten state, and updates the counter value for the target page when the state of the target second area indicated by the management information is the written state.

10. The device according to claim 9, wherein
the circuitry executes a management information generation process when the management information on the target page is not present in the management table,
in the management information generation process, the circuitry:
    writes the management information on the target page in an unused entry when there is the unused entry in the management table; and
    writes the management information on the target page by erasing the management information written in any in-use entry, and updates the counter value for a page that has been managed by the erased management information when there is no unused entry in the management table.

11. The device according to claim 9, wherein the circuitry selects a page for which the management information is stored based on the management table, and whose number of written second areas is largest, as the exchange target page.

12. The device according to claim 9, wherein the circuitry selects the exchange target page out of at least one page for which the management information is stored based on the management table, and whose number of written second areas is equal to or larger than a predetermined value.

13. The device according to claim 9, wherein the circuitry selects a page whose counter value is largest, as the exchange target page.

14. The device according to claim 9, wherein the circuitry selects a page whose counter value is largest among pages excluding pages whose number of written second areas is smaller than a predetermined value in the management table, as the exchange target page.

15. An information processing device comprising:
the processing circuit;
the first memory;
the non-volatile memory; and
the management device according to claim 1.

* * * * *